(12) United States Patent
Iwamoto et al.

(10) Patent No.: US 11,145,324 B2
(45) Date of Patent: *Oct. 12, 2021

(54) MAGNETIC TAPE HAVING CHARACTERIZED MAGNETIC LAYER AND MAGNETIC RECORDING AND REPRODUCING DEVICE

(71) Applicant: FUJIFILM Corporation, Tokyo (JP)

(72) Inventors: Takahiro Iwamoto, Minami-ashigara (JP); Hidemasa Hosoda, Minami-ashigara (JP); Norihito Kasada, Minami-ashigara (JP); Takuto Kurokawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/832,284

(22) Filed: Mar. 27, 2020

(65) Prior Publication Data

US 2020/0227084 A1 Jul. 16, 2020

Related U.S. Application Data

(63) Continuation of application No. PCT/JP2018/033530, filed on Sep. 11, 2018.

(30) Foreign Application Priority Data

Sep. 29, 2017 (JP) .............................. JP2017-191659
Aug. 28, 2018 (JP) .............................. JP2018-159512

(51) Int. Cl.
  *G11B 5/706* (2006.01)
  *G11B 5/735* (2006.01)
  *G11B 5/008* (2006.01)
  *G11B 5/708* (2006.01)
  *G11B 5/712* (2006.01)
  *G11B 5/714* (2006.01)

(52) U.S. Cl.
  CPC ...... *G11B 5/70678* (2013.01); *G11B 5/00817* (2013.01); *G11B 5/7085* (2013.01); *G11B 5/712* (2013.01); *G11B 5/714* (2013.01); *G11B 5/7358* (2019.05)

(58) Field of Classification Search
  None
  See application file for complete search history.

(56) References Cited

U.S. PATENT DOCUMENTS

| | | |
|---|---|---|
| 3,966,686 A | 6/1976 | Asakura et al. |
| 4,112,187 A | 9/1978 | Asakura et al. |
| 4,425,404 A | 1/1984 | Suzuki et al. |
| 4,590,119 A * | 5/1986 | Kawakami ........... G11B 5/7305 360/134 |
| 4,693,930 A | 9/1987 | Kuo et al. |
| 4,731,292 A | 3/1988 | Sasaki et al. |
| 4,746,569 A | 5/1988 | Takahashi et al. |
| 4,818,606 A | 4/1989 | Koyama et al. |
| 4,825,317 A | 4/1989 | Rausch |
| 5,006,406 A | 4/1991 | Kovacs |
| 5,242,752 A | 9/1993 | Isobe et al. |
| 5,419,938 A | 5/1995 | Kagotani et al. |
| 5,445,881 A | 8/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 6/1998 | Soui |
| 5,827,600 A | 10/1998 | Ejiri et al. |
| 5,835,314 A | 11/1998 | Moodera et al. |
| 6,099,957 A | 8/2000 | Yamamoto et al. |
| 6,183,606 B1 | 2/2001 | Kuo et al. |
| 6,207,252 B1 | 3/2001 | Shimomura |
| 6,228,461 B1 | 5/2001 | Sueki et al. |
| 6,254,964 B1 | 7/2001 | Saito et al. |

(Continued)

FOREIGN PATENT DOCUMENTS

| | | |
|---|---|---|
| CN | 1630680 A | 6/2005 |
| CN | 1691139 A | 11/2005 |

(Continued)

OTHER PUBLICATIONS

International Search Report dated Nov. 20, 2018 from the International Searching Authority in International Application No. PCT/JP2018/033530.
International Preliminary Report on Patentability dated Mar. 31, 2020 from the International Bureau in International Application No. PCT/JP2018/033530.
Written Opinion dated Nov. 20, 2018 from the International Bureau in International Application No. PCT/JP2018/033530.
International Preliminary Report on Patentability dated Mar. 31, 2020 in International Application No. PCT/JP2018/033531, corresponding to U.S. Appl. No. 16/832,788.

(Continued)

*Primary Examiner* — Kevin M Bernatz
(74) *Attorney, Agent, or Firm* — Sughrue Mion, PLLC

(57) ABSTRACT

Provided are a magnetic tape comprising a magnetic layer containing a ferromagnetic powder and a binding agent on a non-magnetic support, in which the magnetic layer contains an oxide abrasive, an average particle diameter of the oxide abrasive obtained from a secondary ion image acquired by irradiating a surface of the magnetic layer with a focused ion beam is 0.04 μm to 0.08 μm, and an absolute value ΔN of a difference between a refractive index Nxy measured with respect to an in-plane direction of the magnetic layer and a refractive index Nz measured with respect to a thickness direction of the magnetic layer is 0.25 to 0.40, and a magnetic recording and reproducing device including the magnetic tape.

12 Claims, No Drawings

(56) References Cited

U.S. PATENT DOCUMENTS

| | | |
|---|---|---|
| 6,261,647 B1 | 7/2001 | Komatsu et al. |
| 6,268,043 B1 | 7/2001 | Koizumi et al. |
| 6,282,051 B1 | 8/2001 | Albrecht et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,451 B2 | 12/2004 | Ejiri |
| 6,921,592 B2 | 7/2005 | Tani et al. |
| 6,939,606 B2 | 9/2005 | Hashimoto et al. |
| 6,950,269 B1 | 9/2005 | Johnson |
| 6,994,925 B2 | 2/2006 | Masaki |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,341,798 B2 | 3/2008 | Hirai |
| 7,474,505 B2 | 1/2009 | Hirai |
| 7,511,907 B2 | 3/2009 | Dugas et al. |
| 7,515,383 B2 | 4/2009 | Saito et al. |
| 7,656,602 B2 | 2/2010 | Iben et al. |
| 7,755,863 B2 | 7/2010 | Neumann et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,318,242 B2 | 11/2012 | Bradshaw et al. |
| 8,524,108 B2 | 9/2013 | Hattori |
| 8,535,817 B2 * | 9/2013 | Imaoka ................ G11B 5/70 428/844 |
| 8,576,510 B2 | 11/2013 | Cherubini et al. |
| 8,609,264 B2 | 12/2013 | Mitsuoka et al. |
| 8,681,451 B2 | 3/2014 | Harasawa et al. |
| 9,105,294 B2 | 8/2015 | Jensen et al. |
| 9,159,341 B2 | 10/2015 | Bradshaw et al. |
| 9,311,946 B2 | 4/2016 | Tanaka et al. |
| 9,324,343 B2 | 4/2016 | Bradshaw et al. |
| 9,495,985 B2 | 11/2016 | Biskeborn et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,104 B1 | 12/2017 | Biskeborn |
| 9,837,116 B2 | 12/2017 | Ozawa et al. |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,710 B2 | 5/2018 | Kasada |
| 9,984,712 B1 | 5/2018 | Ozawa et al. |
| 9,984,716 B1 | 5/2018 | Kaneko et al. |
| 10,008,230 B1 | 6/2018 | Ozawa et al. |
| 10,026,430 B2 | 7/2018 | Kasada et al. |
| 10,026,433 B2 | 7/2018 | Kasada et al. |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 | 11/2018 | Kasada et al. |
| 10,170,144 B2 | 1/2019 | Ozawa et al. |
| 10,347,280 B2 | 7/2019 | Kasada et al. |
| 10,373,633 B2 | 8/2019 | Kaneko et al. |
| 10,373,639 B2 | 8/2019 | Kasada et al. |
| 10,403,314 B2 | 9/2019 | Kasada et al. |
| 10,403,319 B2 | 9/2019 | Kasada |
| 10,403,320 B2 | 9/2019 | Kasada et al. |
| 10,410,666 B2 | 9/2019 | Kasada et al. |
| 10,431,248 B2 | 10/2019 | Kasada et al. |
| 10,431,249 B2 | 10/2019 | Kasada et al. |
| 10,431,250 B2 | 10/2019 | Tada et al. |
| 10,438,624 B2 | 10/2019 | Kasada |
| 10,438,625 B2 | 10/2019 | Ozawa et al. |
| 10,438,628 B2 | 10/2019 | Kasada et al. |
| 10,453,488 B2 | 10/2019 | Kurokawa et al. |
| 10,460,756 B2 | 10/2019 | Kasada et al. |
| 10,475,481 B2 | 11/2019 | Oyanagi et al. |
| 10,477,072 B2 | 11/2019 | Kasada |
| 10,482,913 B2 | 11/2019 | Kasada |
| 10,490,220 B2 | 11/2019 | Kasada et al. |
| 10,497,384 B2 | 12/2019 | Kasada et al. |
| 10,497,388 B2 | 12/2019 | Ozawa et al. |
| 10,510,366 B2 | 12/2019 | Kaneko et al. |
| 10,515,657 B2 * | 12/2019 | Kasada ............... G11B 5/00813 |
| 10,515,660 B2 | 12/2019 | Oyanagi et al. |
| 10,515,661 B2 | 12/2019 | Kasada et al. |
| 10,522,171 B2 | 12/2019 | Kasada et al. |
| 10,522,180 B2 | 12/2019 | Kasada |
| 10,546,602 B2 | 1/2020 | Kasada et al. |
| 10,573,338 B2 | 2/2020 | Kasada et al. |
| 10,643,646 B2 | 5/2020 | Kasada et al. |
| 10,672,426 B2 | 6/2020 | Kasada |
| 10,706,875 B2 | 7/2020 | Kasada et al. |
| 10,755,741 B2 | 8/2020 | Ozawa et al. |
| 10,839,850 B2 | 11/2020 | Tada et al. |
| 10,854,231 B2 * | 12/2020 | Kasada ............... G11B 5/70678 |
| 10,854,233 B2 * | 12/2020 | Ozawa ............... G11B 5/70678 |
| 10,854,234 B2 * | 12/2020 | Kasada ............... G11B 5/00813 |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0128453 A1 | 7/2003 | Saito et al. |
| 2003/0170498 A1 | 9/2003 | Inoue |
| 2003/0203240 A1 | 10/2003 | Seng et al. |
| 2003/0228492 A1 | 12/2003 | Ejiri et al. |
| 2003/0228493 A1 | 12/2003 | Doushita et al. |
| 2004/0013892 A1 | 1/2004 | Yano et al. |
| 2004/0018388 A1 | 1/2004 | Kitamura et al. |
| 2004/0053074 A1 | 3/2004 | Jingu et al. |
| 2004/0072025 A1 | 4/2004 | Kishimoto et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2004/0265643 A1 | 12/2004 | Ejiri |
| 2005/0020803 A1 | 1/2005 | Machida et al. |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0083954 A1 | 4/2006 | Meguro et al. |
| 2006/0187589 A1 | 8/2006 | Harasawa et al. |
| 2006/0232883 A1 | 10/2006 | Biskeborn et al. |
| 2007/0009769 A1 | 1/2007 | Kanazawa |
| 2007/0020489 A1 | 1/2007 | Yamazaki et al. |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |

(56) References Cited

U.S. PATENT DOCUMENTS

| | | |
|---|---|---|
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2009/0174970 A1 | 7/2009 | Inoue et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0073816 A1 | 3/2010 | Komori et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2010/0284105 A1 | 11/2010 | Dugas et al. |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0003503 A1 | 1/2012 | Mori |
| 2012/0045664 A1 | 2/2012 | Tanaka et al. |
| 2012/0152891 A1 | 6/2012 | Brown et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2012/0314319 A1 | 12/2012 | Olson et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0171993 A1 | 6/2016 | Okubo |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0092316 A1 | 3/2017 | Imamura et al. |
| 2017/0130156 A1 | 5/2017 | Kondo et al. |
| 2017/0162220 A1 | 6/2017 | Nakashio et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374504 A1 | 12/2018 | Kasada |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027177 A1 | 1/2019 | Kasada |
| 2019/0027178 A1 | 1/2019 | Kasada |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1* | 4/2019 | Kasada ............... G11B 5/00813 |
| 2019/0103133 A1* | 4/2019 | Ozawa .................... G11B 5/71 |
| 2019/0103134 A1* | 4/2019 | Kasada ................. G11B 5/714 |
| 2019/0103135 A1* | 4/2019 | Ozawa ................. G11B 5/735 |
| 2019/0130936 A1 | 5/2019 | Kaneko et al. |

(56) References Cited

U.S. PATENT DOCUMENTS

| | | | |
|---|---|---|---|
| 2019/0259416 | A1 | 8/2019 | Kawakami et al. |
| 2019/0295581 | A1* | 9/2019 | Kasada ............. G11B 5/70678 |
| 2019/0295586 | A1 | 9/2019 | Kasada |
| 2019/0295587 | A1* | 9/2019 | Kasada ................... G11B 5/70 |
| 2019/0295588 | A1 | 9/2019 | Kasada |
| 2019/0295589 | A1 | 9/2019 | Kasada |
| 2019/0295590 | A1 | 9/2019 | Kaneko et al. |
| 2019/0304496 | A1 | 10/2019 | Fujimoto |
| 2020/0005814 | A1 | 1/2020 | Kasada et al. |
| 2020/0005818 | A1 | 1/2020 | Kasada et al. |
| 2020/0005827 | A1 | 1/2020 | Ozawa et al. |
| 2020/0035262 | A1* | 1/2020 | Kasada .................. G11B 5/708 |
| 2020/0035265 | A1* | 1/2020 | Kasada .................. G11B 5/706 |
| 2020/0126589 | A1* | 4/2020 | Iwamoto ................ G11B 5/702 |
| 2020/0211592 | A1* | 7/2020 | Kasada ............. G11B 5/59688 |
| 2020/0211593 | A1 | 7/2020 | Kasada |
| 2020/0227081 | A1* | 7/2020 | Hosoda ............. G11B 5/70678 |
| 2020/0243110 | A1 | 7/2020 | Kasada |
| 2020/0251135 | A1* | 8/2020 | Kasada ................... G11B 5/78 |
| 2020/0251139 | A1 | 8/2020 | Kasada et al. |
| 2021/0020195 | A1 | 1/2021 | Kasada |
| 2021/0090599 | A1 | 3/2021 | Nakano et al. |

FOREIGN PATENT DOCUMENTS

| | | | |
|---|---|---|---|
| CN | 101105949 A | 1/2008 |
| CN | 102459429 A | 5/2012 |
| CN | 105324650 A | 2/2016 |
| DE | 101 46 429 A1 | 3/2002 |
| EP | 0 421 213 A2 | 4/1991 |
| EP | 0 520 155 B1 | 8/1996 |
| GB | 2495356 A | 4/2013 |
| JP | 60-171626 A | 9/1985 |
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 63-298813 A | 12/1988 |
| JP | 64-057422 A | 3/1989 |
| JP | 64-60819 A | 3/1989 |
| JP | 1-276424 A | 11/1989 |
| JP | 2-168415 A | 6/1990 |
| JP | 2-227821 A | 9/1990 |
| JP | 4-123312 A | 4/1992 |
| JP | 5-258283 A | 10/1993 |
| JP | 5-298653 A | 11/1993 |
| JP | 7-57242 A | 3/1995 |
| JP | 07-114723 A | 5/1995 |
| JP | 9-73626 A | 3/1997 |
| JP | 9-190623 A | 7/1997 |
| JP | 11-110743 A | 4/1999 |
| JP | 11-175949 A | 7/1999 |
| JP | 11-259849 A | 9/1999 |
| JP | 11-273051 A | 10/1999 |
| JP | 2000-251240 A | 9/2000 |
| JP | 2002-8910 A | 1/2002 |
| JP | 2002-157726 A | 5/2002 |
| JP | 2002-298332 A | 10/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-5793 A | 1/2004 |
| JP | 2004-005820 A | 1/2004 |
| JP | 2004-103186 A | 4/2004 |
| JP | 2004-114492 A | 4/2004 |
| JP | 2004-133997 A | 4/2004 |
| JP | 2004-185676 A | 7/2004 |
| JP | 2005-29656 A | 2/2005 |
| JP | 2005-038579 A | 2/2005 |
| JP | 2005-243063 A | 9/2005 |
| JP | 2005-243162 A | 9/2005 |
| JP | 2006-54018 A | 2/2006 |
| JP | 2006-92672 A | 4/2006 |
| JP | 2006-257434 A | 9/2006 |
| JP | 2006-286114 A | 10/2006 |
| JP | 2007-265555 A | 10/2007 |
| JP | 2007-273039 A | 10/2007 |
| JP | 2007-287310 A | 11/2007 |
| JP | 2007-297427 A | 11/2007 |
| JP | 2007-305197 A | 11/2007 |
| JP | 2008-047276 A | 2/2008 |
| JP | 2008-243317 A | 10/2008 |
| JP | 2009-093738 A | 4/2009 |
| JP | 2009-245515 A | 10/2009 |
| JP | 2009-283082 A | 12/2009 |
| JP | 2010-036350 A | 2/2010 |
| JP | 2010-49731 A | 3/2010 |
| JP | 2011-48878 A | 3/2011 |
| JP | 2011-134372 A | 7/2011 |
| JP | 2011-138566 A | 7/2011 |
| JP | 2011-187142 A | 9/2011 |
| JP | 2011-210288 A | 10/2011 |
| JP | 2011-225417 A | 11/2011 |
| JP | 2012-38367 A | 2/2012 |
| JP | 2012-043495 A | 3/2012 |
| JP | 2012-203955 A | 10/2012 |
| JP | 2012-203956 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |
| JP | 2016-071912 A | 5/2016 |
| JP | 2016-71926 A | 5/2016 |
| JP | 2016-110680 A | 6/2016 |
| JP | 2016-126817 A | 7/2016 |
| JP | 2016-139451 A | 8/2016 |
| JP | 2016-177851 A | 10/2016 |
| JP | 2017-016732 A | 1/2017 |
| JP | 2017-041291 A | 2/2017 |
| JP | 2017-041296 A | 2/2017 |
| JP | 2017-228328 A | 12/2017 |
| JP | 2018-73454 A | 5/2018 |
| WO | 2019/065200 A1 | 4/2019 |

OTHER PUBLICATIONS

International Search Report dated Nov. 20, 2018 in International Application No. PCT/JP2018/033531, corresponding to U.S. Appl. No. 16/832,788.
Notice of Allowance dated Jul. 28, 2020 in U.S. Appl. No. 16/361,589.
Notice of Allowance dated Jul. 29, 2020 in U.S. Appl. No. 16/361,597.
Notice of Allowance dated Sep. 17, 2020 in U.S. Appl. No. 16/522,867.
Office Action dated Jun. 25, 2020 in U.S. Appl. No. 16/727,181.
Office Action dated Mar. 13, 2020 in U.S. Appl. No. 16/361,589.
Office Action dated Mar. 13, 2020 in U.S. Appl. No. 16/522,867.
Office Action dated Mar. 2, 2020 in U.S. Appl. No. 16/522,894.
Office Action dated Sep. 29, 2020 in Japanese Application No. 2018-141866, corresponds to U.S. Appl. No. 16/522,867.
Office Action dated Sep. 29, 2020 in Japanese Application No. 2018-141867, corresponds to U.S. Appl. No. 16/522,894.
Written Opinion dated Nov. 20, 2018 in International Application No. PCT/JP2018/033531, corresponding to U.S. Appl. No. 16/832,788.
Notice of Allowance dated Jun. 23, 2020 in U.S. Appl. No. 16/522,894.
Office Action dated Mar. 13, 2020 in U.S. Appl. No. 16/361,597.
Office Action dated Sep. 15, 2020 in U.S. Appl. No. 16/832,788.
Office Action dated Sep. 23, 2020 in Japanese Application No. 2019-050201, corresponds to U.S. Appl. No. 16/361,589.
Office Action dated Sep. 29, 2020 in Japanese Application No. 2018-246871, corresponds to U.S. Appl. No. 16/727,181.
Office Action dated Jul. 20, 2020 in U.S. Appl. No. 16/777,411.
U.S. Appl. No. 16/777,411, Pending.

(56) References Cited

OTHER PUBLICATIONS

U.S. Appl. No. 16/361,589, Allowed; RCE filed.
U.S. Appl. No. 16/361,597, Allowed; RCE filed.
U.S. Appl. No. 16/522,867, Allowed.
U.S. Appl. No. 16/522,894, Allowed; RCE filed.
U.S. Appl. No. 16/727,181, Pending.
U.S. Appl. No. 16/832,788, Pending.
U.S. Appl. No. 17/032,621, Pending.
Office Action dated Nov. 6, 2020 in Chinese Application No. 201880062980.4.
U.S. Appl. No. 16/777,411, Allowed.
U.S. Appl. No. 16/361,597, Allowed.
U.S. Appl. No. 16/522,894, Allowed.
U.S. Appl. No. 16/727,181, Allowed; RCE filed.
Notice of Allowance dated Nov. 4, 2020 in U.S. Appl. No. 16/727,181.
Notice of Allowance dated Nov. 5, 2020 in U.S. Appl. No. 16/361,597.
Notice of Allowance dated Nov. 12, 2020 in U.S. Appl. No. 16/777,411.
Office Action dated Nov. 3, 2020 in Chinese Application No. 201880063019.7; corresponds to U.S. Appl. No. 16/832,788.
Advisory Action dated Jul. 5, 2018 in U.S. Appl. No. 14/838,663.
Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Jun. 9, 2017 which issued during the prosecution of U.S. Appl. No. 15/388,864.
Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
"Introduction to TMR Magnetic Sensors", Anonymous, Mar. 12, 2015, MR Sensor Technology, pp. 1-5 (Year: 2015).
Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 28, 2018 from the US Patent & Trademark Office in U.S. Appl. No. 15/422,821.
Notice of Allowance dated Aug. 30, 2017, which issued during the prosecution of U.S. Appl. No. 15/466,143.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.

(56) References Cited

OTHER PUBLICATIONS

Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated Mar. 13, 2019 in U.S. Appl. No. 16/100,289.
Notice of Allowance dated Mar. 14, 2018 in U.S. Appl. No. 15/854,329.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated Mar. 5, 2019 in U.S. Appl. No. 16/009,603.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated May 4, 2018 which issued during the prosecution of U.S. Appl. No. 15/422,821.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Aug. 23, 2019 in U.S. Appl. No. 15/854,409.
Office Action dated Aug. 25, 2017 in U.S. Appl. No. 14/838,663.
Office Action dated Aug. 27, 2019 in Japanese Application No. 2016-254428.
Office Action dated Aug. 27, 2019 in Japanese Application No. 2016-254430.
Office Action dated Aug. 27, 2019 in Japanese Application No. 2016-254432.
Office Action dated Aug. 28, 2019 in U.S. Appl. No. 15/854,397.
Office Action dated Aug. 6, 2019 in Japanese Application No. 2016-254421.
Office Action dated Aug. 6, 2019 in Japanese Application No. 2016-254427.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.

(56) References Cited

OTHER PUBLICATIONS

Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 11, 2016 in U.S. Appl. No. 14/838,663.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 5, 2019 in U.S. Appl. No. 16/038,339.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Jul. 16, 2019 in Japanese Application No. 2016-124933.
Office Action dated Jun. 10, 2019 in U.S. Appl. No. 15/920,518.
Office Action dated Jun. 25, 2019 in Japanese Application No. 2015-245144.
Office Action dated Jun. 6, 2019 in U.S. Appl. No. 15/899,587.
Office Action dated Mar. 15, 2018 in U.S. Appl. No. 14/838,663.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 30, 2017 in U.S. Appl. No. 14/838,663.
Office Action dated Mar. 5, 2019 in U.S. Appl. No. 15/443,026.
Office Action dated Mar. 5, 2019 in U.S. Appl. No. 15/854,397.
Office Action dated Mar. 6, 2019 in U.S. Appl. No. 15/854,403.
Office Action dated Mar. 7, 2019 in U.S. Appl. No. 15/854,439.
Office Action dated May 23, 2019 in U.S. Appl. No. 15/388,911.
Office Action dated Nov. 14, 2018 in U.S. Appl. No. 16/100,289.
Office Action dated Nov. 19, 2018 in U.S. Appl. No. 15/900,141.
Office Action dated Oct. 12, 2018 in U.S. Appl. No. 15/854,397.
Office Action dated Sep. 12, 2016 in U.S. Appl. No. 14/838,663.
Office Action dated Sep. 16, 2019 in U.S. Appl. No. 15/854,403.
Office Action dated Sep. 17, 2019 in Japanese Application No. 2017-029499.
Office Action dated Sep. 19, 2019 in U.S. Appl. No. 15/443,026.
Office Action dated Sep. 20, 2019 in U.S. Appl. No. 15/442,961.
Office Action dated Sep. 24, 2019 in Japanese Application No. 2016-254436.
Office Action dated Sep. 24, 2019 in Japanese Application No. 2016-254439.
Office Action dated Sep. 24, 2019 in Japanese Application No. 2016-254441.
Office Action dated Sep. 24, 2019 in Japanese Application No. 2016-254450.
Office Action dated Sep. 24, 2019 in Japanese Application No. 2017-029491.
Office Action dated Sep. 24, 2019 in Japanese Application No. 2017-029508.
Office Action dated Sep. 24, 2019 in Japanese Application No. 2017-065730.
Office Action dated Sep. 3, 2019 in Japanese Application No. 2016-254434.
Office Action dated Oct. 1, 2019 in Japanese Application No. 2017-029495.
Office Action dated Oct. 1, 2019 in Japanese Application No. 2017-029493.
Office Action dated Oct. 1, 2019 in Japanese Application No. 2017-029494.
Office Action dated Oct. 2, 2019 in U.S. Appl. No. 15/443,094.
Office Action dated Oct. 5, 2017 from the United States Patent and Trademark Office in U.S. Appl. No. 15/241,286.
Office Action dated Oct. 5, 2017 from the United States Patent and Trademark Office in U.S. Appl. No. 15/241,631.
Office Action dated Oct. 5, 2017 from the United States Patent and Trademark Office in U.S. Appl. No. 15/378,907.
Office Action dated Oct. 5, 2017 from the United States Patent and Trademark Office in U.S. Appl. No. 15/241,297.
Notice of Allowance dated Mar. 21, 2018 in U.S. Appl. No. 15/241,286.
Notice of Allowance dated Mar. 27, 2018 in U.S. Appl. No. 15/241,631.
Notice of Allowance dated Mar. 19, 2018 in U.S. Appl. No. 15/378,907.
Notice of Allowance dated Mar. 21, 2018 in U.S. Appl. No. 15/241,297.
Office Action dated Oct. 8, 2019 in Japanese Application No. 2017-029492.
Office Action dated Oct. 8, 2019 in Japanese Application No. 2017-065700.
Office Action dated Oct. 8, 2019 in Japanese Application No. 2017-065708.
Office Action dated Oct. 8, 2019 in Japanese Application No. 2017-065678.
Office Action dated Oct. 10, 2019 in U.S. Appl. No. 15/705,531.
Office Action dated Oct. 9, 2019 in U.S. Appl. No. 16/440,161.
Office Action dated Oct. 22, 2019 in U.S. Appl. No. 16/037,564.
Notice of Allowance dated Oct. 17, 2019 in U.S. Appl. No. 15/388,911.
Office Action dated Dec. 10, 2019 in Japanese Application No. 2016-254428.
Office Action dated Dec. 17, 2019 in Japanese Application No. 2016-254430.
Office Action dated Dec. 17, 2019 in Japanese Application No. 2016-254432.
Office Action dated Dec. 17, 2019 in Japanese Application No. 2017-029507.
Office Action dated Dec. 24, 2019 in Japanese Application No. 2016-254434.
Office Action dated Dec. 24, 2019 in Japanese Application No. 2017-029510.
Office Action dated Nov. 26, 2019 in Japanese Application No. 2016-254421.
Office Action dated Nov. 26, 2019 in Japanese Application No. 2017-029496.

(56) References Cited

OTHER PUBLICATIONS

Office Action dated Nov. 26, 2019 in Japanese Application No. 2017-029502.
Office Action dated Nov. 26, 2019 in Japanese Application No. 2017-065694.
Advisory Action dated Jan. 17, 2020 in U.S. Appl. No. 15/443,094.
Office Action dated Jan. 28, 2020 in U.S. Appl. No. 15/442,961.
Notice of Allowance dated Feb. 7, 2020 in U.S. Appl. No. 16/440,161.
Notice of Allowance dated Feb. 20, 2020 in U.S. Appl. No. 15/705,531.
Office Action dated Feb. 21, 2020 in U.S. Appl. No. 16/038,514.
Notice of Allowance dated Mar. 18, 2020 in U.S. Appl. No. 16/037,564.
Office Action dated Mar. 10, 2020 in U.S. Appl. No. 16/037,573.
Office Action dated Mar. 10, 2020 in U.S. Appl. No. 16/037,596.
Office Action dated Mar. 10, 2020 in U.S. Appl. No. 16/037,681.
Office Action dated Mar. 10, 2020 in U.S. Appl. No. 16/038,545.
Office Action dated Mar. 10, 2020 in U.S. Appl. No. 16/038,687.
Office Action dated Mar. 10, 2020 in U.S. Appl. No. 16/038,771.
Office Action dated Mar. 10, 2020 in U.S. Appl. No. 16/038,884.
Office Action dated Mar. 10, 2020 in U.S. Appl. No. 16/038,847.
Office Action dated Mar. 10, 2020 in U.S. Appl. No. 16/142,560.
Office Action dated Mar. 10, 2020 in U.S. Appl. No. 16/144,428.
Office Action dated Mar. 13, 2020 in U.S. Appl. No. 16/038,669.
Office Action dated Mar. 13, 2020 in U.S. Appl. No. 16/144,605.
Office Action dated Mar. 31, 2020 in U.S. Appl. No. 15/443,026.
Office Action dated Apr. 1, 2020 in U.S. Appl. No. 15/443,094.
Office Action dated Apr. 29, 2020 in U.S. Appl. No. 16/012,018.
Notice of Allowance dated May 7, 2020 in U.S. Appl. No. 16/038,514.
Notice of Allowance dated Aug. 17, 2020 in U.S. Appl. No. 15/443,026.
Notice of Allowance dated Aug. 3, 2020 in U.S. Appl. No. 16/038,847.
Notice of Allowance dated Aug. 3, 2020 in U.S. Appl. No. 16/038,884.
Notice of Allowance dated Jul. 23, 2020 in U.S. Appl. No. 16/037,573.
Notice of Allowance dated Jul. 23, 2020 in U.S. Appl. No. 16/038,669.
Notice of Allowance dated Jul. 24, 2020 in U.S. Appl. No. 16/037,596.
Notice of Allowance dated Jul. 27, 2020 in U.S. Appl. No. 16/038,771.
Notice of Allowance dated Jul. 29, 2020 in U.S. Appl. No. 16/037,681.
Notice of Allowance dated Jul. 29, 2020 in U.S. Appl. No. 16/142,560.
Notice of Allowance dated Jul. 29, 2020 in U.S. Appl. No. 16/144,428.
Notice of Allowance dated Jul. 29, 2020 in U.S. Appl. No. 16/144,605.
Notice of Allowance dated Jul. 30, 2020 in U.S. Appl. No. 16/038,545.
Notice of Allowance dated Jul. 30, 2020 in U.S. Appl. No. 16/038,687.
Notice of Allowance dated Sep. 17, 2020 in U.S. Appl. No. 16/012,018.
Office Action dated Aug. 25, 2020 in Chinese Application No. 201711439496.2.
Office Action dated Jul. 8, 2020 in U.S. Appl. No. 15/442,961.
Notice of Allowance dated Sep. 23, 2020 in U.S. Appl. No. 15/443,094.
Notice of Allowance dated Nov. 13, 2020 in U.S. Appl. No. 15/442,961.
Office Action dated Sep. 27, 2019 in U.S. Appl. No. 16/361,570.
Communication dated Mar. 3, 2020 by the Japanese Patent Office in application No. 2017-123062; corresponds to U.S. Appl. No. 16/009,461.
Office Action dated Jun. 10, 2020 in U.S. Appl. No. 16/848,331.
Office Action dated Jun. 16, 2020 in U.S. Appl. No. 16/777,201.
Office Action dated Aug. 18, 2020 in U.S. Appl. No. 16/361,797.
Office Action dated Sep. 2, 2020 in U.S. Appl. No. 16/361,814.
Notice of Allowance dated Dec. 9, 2020 in U.S. Appl. No. 16/727,181.
Notice of Allowance datec Dec. 31, 2020 in U.S. Appl. No. 16/361,589.
Notice of Allowance dated Dec. 31, 2020 in U.S. Appl. No. 16/143,747.
Office Action dated Mar. 10, 2020 in U.S. Appl. No. 16/143,747.
Notice of Allowance dated Sep. 16, 2020 in U.S. Appl. No. 16/848,331.
Notice of Allowance dated Oct. 1, 2020 in U.S. Appl. No. 16/777,201.
Notice of Allowance dated Dec. 2, 2020 in U.S. Appl. No. 16/361,797.
Notice of Allowance dated Feb. 3, 2021 in U.S. Appl. No. 16/832,788.
Notice of Allowance dated Feb. 26, 2021 in U.S. Appl. No. 16/777,411.
Notice of Allowance dated Mar. 8, 2021 in U.S. Appl. No. 16/727,181.
Notice of Allowance dated Mar. 9, 2021 in U.S. Appl. No. 16/522,894.
Notice of Allowance dated Apr. 7, 2021 in U.S. Appl.No. 16/361,597.
Office Action dated Apr. 19, 2021 in U.S. Appl. No. 17/032,621.
Notice of Allowance dated Apr. 28, 2021 in U.S. Appl. No. 16/361,589.
U.S. Appl. No. 17/328,620, filed May 24, 2021 (Kasada).
U.S. Appl. No. 17/330,680, filed May 26, 2021 (Kasada).
Office Action dated Jun. 17, 2021 in U.S. Appl. No. 16/522,894.
Office Action dated Jul. 15, 2021 in U.S. Appl. No. 16/832,788.
U.S. Appl. No. 17/368,274, filed Jul. 6, 2021 (Kasada).
Notice of Allowance dated Aug. 17, 2021 in U.S. Appl. No. 17/032,621.
Office Action dated Aug. 23, 2021 in U.S. Appl. No. 16/777,411.
U.S. Appl. No. 17/368,274, filed Jul. 28, 2021 (Kasada).

* cited by examiner

MAGNETIC TAPE HAVING CHARACTERIZED MAGNETIC LAYER AND MAGNETIC RECORDING AND REPRODUCING DEVICE

CROSS-REFERENCE TO RELATED APPLICATIONS

This application is a Continuation of PCT International Application No. PCT/JP2018/033530 filed on Sep. 11, 2018, which claims priority under 35 U.S.C. § 119(a) to Japanese Patent Application No. 2017-191659 filed on Sep. 29, 2017 and Japanese Patent Application No. 2018-159512 filed on Aug. 28, 2018. Each of the above applications is hereby expressly incorporated by reference, in its entirety, into the present application.

BACKGROUND OF THE INVENTION

1. Field of the Invention

The present invention relates to a magnetic tape and a magnetic recording and reproducing device.

2. Description of the Related Art

Magnetic recording media are divided into tape-shaped magnetic recording media and disk-shaped magnetic recording media, and tape-shaped magnetic recording media, that is, magnetic tapes are mainly used for data storage. The recording of information on a magnetic tape and/or reproducing thereof are normally performed by causing a surface of the magnetic tape (a surface of a magnetic layer) to come into contact with a magnetic head (hereinafter, also simply referred to as a "head") for sliding. As the magnetic tape, a magnetic tape having a configuration in which a magnetic layer containing an abrasive in addition to a ferromagnetic powder and a binding agent is provided on a non-magnetic support is widely used (for example, see JP2005-243162A).

SUMMARY OF THE INVENTION

One of the performances required for a magnetic tape is that it can exhibit excellent electromagnetic conversion characteristics in a case of reproducing information recorded on the magnetic tape. However, in a case where the surface of the magnetic layer and/or the head is chipped while repeatedly sliding between the magnetic layer surface and the head, a phenomenon (so-called spacing loss) occurs that the distance between the magnetic layer surface and the reproducing element of the head increases. In this regard, as disclosed in JP2005-243162A, for example, inclusion of an abrasive in the magnetic layer can contribute to providing head cleaning properties on the surface of the magnetic layer by the abrasive. By providing head cleaning properties on the surface of the magnetic layer, it is possible to suppress the occurrence of spacing loss due to the foreign matter generated by chipping the surface of the magnetic layer interposed between the surface of the magnetic layer and the head. On the other hand, the higher the head cleaning property of the magnetic layer surface, the easier it is to chip the head due to sliding with the magnetic layer surface, resulting in the generation of spacing loss. Such spacing loss causes a phenomenon in which the electromagnetic conversion characteristics decrease while repeating the reproduction of information recorded on the magnetic tape (hereinafter also referred to as "a decrease in the electromagnetic conversion characteristics in repeated reproduction").

In recent years, magnetic tapes used for data storage may be used in a low temperature and low humidity environment such as data centers where temperature and humidity are controlled (for example, in an environment where the temperature is 10 to 15° C. and the relative humidity is about 10 to 20%). However, from the viewpoint of reducing the cost of air conditioning for temperature and humidity management, it is desirable that the management conditions for temperature and humidity during use can be relaxed from the present level, or management can be made unnecessary.

In view of the above, the inventors have studied to ease the management conditions of temperature and humidity or eliminate the management thereof during use of the magnetic tape. As a result, it has been found that in an environment where the management conditions of temperature and humidity are relaxed or management is unnecessary (hereinafter, referred to as a "high temperature and high humidity environment"), the electromagnetic conversion characteristics may be likely to be reduced in repeated reproduction. The high temperature and high humidity environment is, for example, an environment having an atmospheric temperature of 30 to 45° C. and a relative humidity of 65% or greater (for example, 65 to 90%).

An object of the invention is to provide a magnetic tape in which a decrease in electromagnetic conversion characteristics in repeated reproduction under a high temperature and high humidity environment is suppressed.

One aspect of the invention relates to a magnetic tape comprising a magnetic layer containing a ferromagnetic powder and a binding agent on a non-magnetic support, in which the magnetic layer contains an oxide abrasive, an average particle diameter (hereinafter, also referred to as a "FIB abrasive diameter") of the oxide abrasive obtained from a secondary ion image acquired by irradiating a surface of the magnetic layer with a focused ion beam (FIB) is 0.04 µm to 0.08 µm, and an absolute value ΔN (hereinafter, also referred to as "ΔN (of the magnetic layer)") of a difference between a refractive index Nxy measured with respect to an in-plane direction of the magnetic layer and a refractive index Nz measured with respect to a thickness direction of the magnetic layer is 0.25 to 0.40.

In one aspect, the oxide abrasive may be an alumina powder.

In one aspect, the difference (Nxy−Nz) between the refractive index Nxy and the refractive index Nz may be 0.25 to 0.40.

In one aspect, the ferromagnetic powder may be a ferromagnetic hexagonal ferrite powder.

In one aspect, the magnetic tape may further comprise a non-magnetic layer containing a non-magnetic powder and a binding agent between the non-magnetic support and the magnetic layer.

In one aspect, the magnetic tape may further comprise a back coating layer containing a non-magnetic powder and a binding agent on a surface of the non-magnetic support opposite to a surface provided with the magnetic layer.

Another aspect of the invention relates to a magnetic recording and reproducing device comprising the magnetic tape, and a magnetic head.

According to one aspect of the invention, it is possible to provide a magnetic tape capable of suppressing a decrease in electromagnetic conversion characteristics in repeated reproduction under a high temperature and high humidity environment. In addition, according to another aspect of the

DESCRIPTION OF THE PREFERRED EMBODIMENTS

[Magnetic Tape]

One aspect of the invention relates to a magnetic tape comprising a magnetic layer containing a ferromagnetic powder and a binding agent on a non-magnetic support, in which the magnetic layer contains an oxide abrasive, an average particle diameter (a FIB abrasive diameter) of the oxide abrasive obtained from a secondary ion image acquired by irradiating a surface of the magnetic layer with a focused ion beam is 0.04 μm to 0.08 μm, and an absolute value ΔN of a difference between a refractive index Nxy measured with respect to an in-plane direction of the magnetic layer and a refractive index Nz measured with respect to a thickness direction of the magnetic layer is 0.25 to 0.40.

In the invention and the specification, the "surface of the magnetic layer" is identical to a surface of the magnetic tape on the magnetic layer side. In the invention and the specification, the "ferromagnetic powder" means an aggregate of a plurality of ferromagnetic particles. The "aggregate" is not only limited to an aspect in which particles configuring the aggregate directly come into contact with one another, but also includes an aspect in which a binding agent, an additive, or the like is interposed between the particles. The points described above are also applied to various powders such as the non-magnetic powder of the invention and the specification, in the same manner.

In the invention and the specification, the "oxide abrasive" means a non-magnetic oxide powder having a Mohs hardness of greater than 8.

In the invention and the specification, the FIB abrasive diameter is a value obtained by the following method.

(1) Acquisition of Secondary Ion Image

A secondary ion image of a 25 μm square (25 μm×25 μm) region on the surface of the magnetic layer of the magnetic tape for which FIB abrasive diameter is to be obtained is acquired by a focused ion beam device. As a focused ion beam device, MI4050 manufactured by Hitachi High-Technologies Corporation can be used.

The beam irradiation conditions of the focused ion beam device for acquiring the secondary ion image are set to an acceleration voltage of 30 kV, a current value of 133 pA (picoampere), a beam size of 30 nm, and a brightness of 50%. The coating process before imaging on the magnetic layer surface is not performed. A secondary ion (SI) signal is detected by the secondary ion detector, and a secondary ion image is captured. The imaging conditions for the secondary ion image are determined by the following method. By performing auto contrast brightness (ACB) (that is, performing ACB three times) at three unimaged regions on the surface of the magnetic layer, the tint of the image is stabilized and a contrast reference value and a brightness reference value are determined. The contrast value obtained by lowering the contrast reference value determined by the ACB by 1% and the above brightness reference value are set as the imaging conditions. An unimaged region on the surface of the magnetic layer is selected, and the secondary ion image is captured under the imaging conditions determined above. A portion for displaying the size or the like (micron bar or cross mark) is deleted from the captured image, and the secondary ion image having the number of pixels of 2000 pixels×2000 pixels is acquired. For specific examples of the imaging conditions, the examples described below can be referred to.

(2) Calculation of FIB Abrasive Diameter

The secondary ion image acquired in the section (1) is taken into image processing software and binarized by the following procedure. As the image analysis software, for example, ImageJ which is free software can be used.

The color tone of the secondary ion image acquired in the section (1) is changed to 8 bits. The threshold values for binarization processing are a lower limit value of 250 gradation and an upper limit value of 255 gradation, and the binarization processing is executed with these two threshold values. After the binarization processing, noise component removal processing is performed by image analysis software. The noise component removal processing can be performed by the following method, for example. In the image analysis software ImageJ, the noise cut processing Despeckle is selected, and size 4.0-infinity is set in Analyze Particle to remove the noise component.

In the obtained binarized image, each portion that shines white is determined as the oxide abrasive, the number of portions that shine white is obtained by image analysis software, and the area of each portion that shines white is obtained. The equivalent circle diameter of each portion is obtained from the obtained area of each portion shining white. Specifically, the equivalent circle diameter L is calculated from the obtained area A by $(A/\pi)^{(1/2)} \times 2 = L$.

The above process is performed four times at different locations (25 μm square) on the surface of the magnetic layer of the magnetic tape for which the FIB abrasive diameter is to be obtained, and from the obtained results, the FIB abrasive diameter is calculated by FIB abrasive diameter=$\Sigma(Li)/\Sigma i$. $\Sigma i$ is the total number of portions that shine white observed in the binarized image obtained by performing the process four times. $\Sigma(Li)$ is the sum of equivalent circle diameters L obtained for each portion that shines white observed in the binarized image obtained by performing the process four times. Only a part of the part which shines white may be included in the binarized image. In such a case, $\Sigma i$ and $\Sigma(Li)$ are obtained without including that portion.

In the invention and the specification, the absolute value ΔN of the difference between the refractive index Nxy measured regarding the in-plane direction of the magnetic layer and the refractive index Nz measured regarding the thickness direction of the magnetic layer is a value obtained by the following method.

The refractive index regarding each direction of the magnetic layer is obtained using a double-layer model by spectral ellipsometry. In order to obtain the refractive index of the magnetic layer using the double-layer model by spectral ellipsometry, the value of the refractive index of a portion adjacent to the magnetic layer is used. Hereinafter, an example in a case of obtaining the refractive indexes Nxy and Nz of the magnetic layer of the magnetic tape including a layer configuration in which the non-magnetic layer and the magnetic layer are laminated on the non-magnetic support in this order will be described. However, the magnetic tape according to one aspect of the invention may also be a magnetic tape having a layer configuration in which the magnetic layer is directly laminated on the non-magnetic support without the non-magnetic layer interposed therebetween. Regarding the magnetic tape having such a configuration, the refractive index regarding each direction of the magnetic layer is obtained in the same manner as the following method, using the double-layer model of the magnetic layer and the non-magnetic support. In addition, an incidence angle shown below is an incidence angle in a case where the incidence angle is 0° in a case of vertical incidence.

(1) Preparation of Sample for Measurement

Regarding the magnetic tape including a back coating layer on a surface of a non-magnetic support on a side opposite to the surface provided with a magnetic layer, the measurement is performed after removing the back coating layer of a sample for measurement cut from the magnetic tape. The removal of the back coating layer can be performed by a well-known method of dissolving of the back coating layer using a solvent or the like. As the solvent, for example, methyl ethyl ketone can be used. However, any solvent which can remove the back coating layer need only be used. The surface of the non-magnetic support after removing the back coating layer is roughened by a well-known method so that the reflected light on this surface is not detected, in the measurement of ellipsometer. The roughening can be performed by a method of polishing the surface of the non-magnetic support after removing the back coating layer by using sand paper, for example. Regarding the sample for measurement cut out from the magnetic tape not including the back coating layer, the surface of the non-magnetic support on a side opposite to the surface provided with the magnetic layer is roughened.

In addition, in order to measure the refractive index of the non-magnetic layer described below, the magnetic layer is further removed and the surface of the non-magnetic layer is exposed. In order to measure the refractive index of the non-magnetic support described below, the non-magnetic layer is also further removed and the surface of the non-magnetic support on the magnetic layer side is exposed. The removal of each layer can be performed by a well-known method so as described regarding the removal of the back coating layer. A longitudinal direction described below is a direction which was a longitudinal direction of the magnetic tape, in a case where the sample for measurement is included in the magnetic tape before being cut out. This point applies to other directions described below, in the same manner.

(2) Measurement of Refractive Index of Magnetic Layer

By setting the incidence angles as 65°, 70°, and 75°, and irradiating the surface of the magnetic layer in the longitudinal direction with an incidence ray having a beam diameter of 300 μm by using the ellipsometer, Δ (a phase difference of s-polarized light and p-polarized light) and Ψ (an amplitude ratio of s-polarized light and p-polarized light) is measured. The measurement is performed by changing a wavelength of the incidence ray by 1.5 nm in a range of 400 to 700 nm, and a measurement value at each wavelength is obtained.

The refractive index of the magnetic layer at each wavelength is obtained with a double-layer model as described below, by using the measurement values of A and W of the magnetic layer at each wavelength, the refractive index of the non-magnetic layer in each direction obtained by the following method, and the thickness of the magnetic layer.

The zeroth layer which is a substrate of the double-layer model is set as a non-magnetic layer and the first layer thereof is set as a magnetic layer. The double-layer model is created by assuming that there is no effect of rear surface reflection of the non-magnetic layer, by only considering the reflection of the interfaces of air/magnetic layer and magnetic layer/non-magnetic layer. A refractive index of the first layer which is fit to the obtained measurement value the most is obtained by fitting performed by a least squares method. The refractive index Nx of the magnetic layer in the longitudinal direction and a refractive index $Nz_1$ of the magnetic layer in the thickness direction measured by emitting the incidence ray in the longitudinal direction are obtained as values at the wavelength of 600 nm obtained from the results of the fitting.

In the same manner as described above, except that the direction of incidence of the incidence ray is set as a width direction of the magnetic tape, a refractive index Ny of the magnetic layer in the width direction and a refractive index $Nz_2$ of the magnetic layer in the thickness direction measured by emitting the incidence ray in the width direction are obtained as values at the wavelength of 600 nm obtained from the results of the fitting.

The fitting is performed by the following method.

In general, "complex refractive index n=η+iκ" is satisfied. Here, η is a real number of the refractive index, κ is an extinction coefficient, and i is an imaginary number. In a case where a complex dielectric constant ε=ε1+iε2 (ε1 and ε2 satisfy Kramers-Kronig relation), $ε1=η^2-κ^2$, and $ε^2=2ηκ$, the complex dielectric constant of Nx satisfies that $ε_x=ε_x1+iε_x2$, and the complex dielectric constant of $Nz_1$ satisfies that $ε_{z1}=ε_{z1}1+iε_{z1}2$, in a case of calculating the Nx and $Nz_1$.

The Nx is obtained by setting $ε_x2$ as one Gaussian, setting any point, where a peak position is 5.8 to 5.1 eV and σ is 4 to 3.5 eV, as a starting point, setting a parameter to be offset to a dielectric constant beyond a measurement wavelength range (400 to 700 nm), and performing least squares fitting with respect to the measurement value. In the same manner, $N_{z1}$ is obtained by setting any point of $ε_{z1}2$, where a peak position is 3.2 to 2.9 eV and σ is 1.5 to 1.2 eV, as a starting point, and setting an offset parameter, and performing least squares fitting with respect to the measurement value. Ny and $Nz_2$ are also obtained in the same manner. The refractive index Nxy measured regarding the in-plane direction of the magnetic layer is obtained as "Nxy=(Nx+Ny)/2". The refractive index Nz measured regarding the thickness direction of the magnetic layer is obtained as "Nz=($Nz_1+Nz_2$)/2". From the obtained Nxy and Nz, the absolute value ΔN of difference thereof is obtained.

(3) Measurement of Refractive Index of Non-Magnetic Layer

Refractive indexes of the non-magnetic layer at a wavelength of 600 nm (the refractive index in the longitudinal direction, the refractive index in the width direction, the refractive index in the thickness direction measured by emitting the incidence ray in the longitudinal direction, and the refractive index in the thickness direction measured by emitting the incidence ray in the width direction) are obtained in the same manner as in the method described above, except the following points.

The wavelength of the incidence ray is changed by 1.5 nm in the range of 250 to 700 nm.

By using a double-layer model of a non-magnetic layer and a non-magnetic support, the zeroth layer which is a substrate of the double-layer model is set as the non-magnetic support, and the first layer thereof is set as the non-magnetic layer. The double-layer model is created by assuming that there is no effect of rear surface reflection of the non-magnetic support, by only considering the reflection of the interfaces of air/non-magnetic layer and non-magnetic layer/non-magnetic support.

In the fitting, seven peaks (0.6 eV, 2.3 eV, 2.9 eV, 3.6 eV, 4.6 eV, 5.0 eV, and 6.0 eV) are assumed in the imaginary part (ε2) of the complex dielectric constant, and the parameter to be offset is set to the dielectric constant beyond the measurement wavelength range (250 to 700 nm).

(4) Measurement of Refractive Index of Non-Magnetic Support

The refractive indexes of the non-magnetic support at a wavelength of 600 nm (refractive index in the longitudinal direction, the refractive index in the width direction, the refractive index in the thickness direction measured by emitting the incidence ray in the longitudinal direction, and the refractive index in the thickness direction measured by emitting the incidence ray in the width direction) used for obtaining the refractive indexes of the non-magnetic layer by the double-layer model are obtained in the same manner as in the method described above for measuring the refractive index of the magnetic layer, except the following points.

A single-layer model with only front surface reflection is used, without using the double-layer model.

The fitting is performed by the Cauchy model ($n=An+Bn/\lambda^2$, n is a refractive index, An and Bn are respectively constants determined by fitting, and $\lambda$ is a wavelength).

The inventors have estimated the reason why in the magnetic tape a decrease in electromagnetic conversion characteristics in repeated reproduction under a high temperature and high humidity environment can be suppressed as follows.

The FIB abrasive diameter is a value that can be used as an index of the presence state of the oxide abrasive in the magnetic layer and is obtained from the secondary ion image obtained by irradiating the surface of the magnetic layer with a focused ion beam (FIB). The secondary ion image is generated by capturing the secondary ions generated from the surface of the magnetic layer irradiated with the FIB. On the other hand, as a method for observing the presence state of the abrasive in the magnetic layer, in the related art, as disclosed in paragraph 0109 of JP2005-243162A, for example, a method using a scanning electron microscope (SEM) has been proposed. In the SEM, the surface of the magnetic layer is irradiated with an electron beam, secondary electrons emitted from the surface of the magnetic layer are captured, and an image (the SEM image) is generated. Due to the difference in image generation principle, even in a case where the same magnetic layer is observed, the size of the oxide abrasive obtained from the secondary ion image is different from the size of the oxide abrasive obtained from the SEM image. As a result of intensive studies, the inventors have surmised that the presence state of the oxide abrasive in the magnetic layer is controlled so that the FIB abrasive diameter is 0.04 µm to 0.08 µm using the FIB abrasive diameter obtained by the above method from the secondary ion image as a new index of the presence state of the oxide abrasive in the magnetic layer. The inventors have considered that controlling the presence state of the oxide abrasive in the magnetic layer contributes to suppression of a decrease in electromagnetic conversion characteristics in repeated reproduction under a high temperature and high humidity environment. Specifically, the inventors have assumed that the FIB abrasive diameter of 0.08 µm or less contributes to suppression of head chipping, and the FIB abrasive diameter of 0.04 µm or more contributes to suppression of head chipping in a high temperature and high humidity environment and contributes to providing the head cleaning properties to the surface of the magnetic layer.

It is considered that the magnetic layer in which the oxide abrasive is present so that the FIB abrasive diameter is 0.04 µm to 0.08 µm or has a lower head cleaning property as compared with the magnetic layer having FIB abrasive diameter exceeding the above range. Therefore, in a case where no measures are taken, it is presumed that the foreign matter adhering to the head is not sufficiently removed, causing a spacing loss, and even in a case where the head chipping can be suppressed, the electromagnetic conversion characteristics decrease. Regarding the above-mentioned point, the inventors have thought that $\Delta N$ obtained by the method described above is a value which may be an index of a presence state of the ferromagnetic powder in a surface region of the magnetic layer. It is assumed that $\Delta N$ is a value affected by various factors such as the presence state of the binding agent or the density distribution of the ferromagnetic powder in addition to alignment state of the ferromagnetic powder in the magnetic layer, and the magnetic layer in which each of the factors is controlled and $\Delta N$ is 0.25 to 0.40 is not easily chipped by sliding the head with the surface of the magnetic layer due to the high strength thereof. The inventors have surmised that, this contributes to suppression of the generation of the chipping of the surface of the magnetic layer in the magnetic layer in which the FIB abrasive diameter is within the above range, and as a result, this contributes to suppression of a decrease in the electromagnetic conversion characteristics in repeated reproduction in the high temperature and high humidity environment.

However, the above descriptions are merely a surmise of the inventors and the invention is not limited thereto.

Hereinafter, the magnetic tape will be described more specifically. Hereinafter, a decrease in the electromagnetic conversion characteristics in repeated reproduction under the high temperature and high humidity environment is also simply referred to as "a decrease in the electromagnetic conversion characteristics".

<FIB Abrasive Diameter>

The FIB abrasive diameter obtained from the secondary ion image acquired by irradiating the surface of the magnetic layer of the magnetic tape with the FIB is greater than 0.04 to 0.08 µm. It is considered that the FIB abrasive diameter of 0.08 µm or smaller contributes to suppressing of the head chipping in the repeated reproduction in the high temperature and high humidity environment. Also, it is surmised that the FIB abrasive diameter of 0.04 µm or greater contributes to removing of the foreign matter generated by chipping the surface of the magnetic layer by the exhibition of the head cleaning properties of the surface of the magnetic layer in the repeated reduction in the high temperature and high humidity environment. From a viewpoint of further suppressing a decrease in the electromagnetic conversion characteristics, the FIB abrasive diameter is preferably 0.05 µm or greater, and more preferably 0.06 µm or greater. Further, from the same viewpoint, the FIB abrasive diameter is preferably 0.07 µm or smaller.

A specific aspect of means for adjusting FIB abrasive diameter will be described below.

<$\Delta N$ of Magnetic Layer>

$\Delta N$ of the magnetic layer of the magnetic tape is 0.25 to 0.40. It is considered that in the high temperature and high humidity environment, the friction coefficient tends to increase in a case where the magnetic layer surface slides on the head, and the magnetic layer surface is likely to be chipped. This is considered to be the reason that the electromagnetic conversion characteristics are likely to be reduced in the repeated reproduction under the high temperature and high humidity environment. On the other hand, as described above, it is surmised that the magnetic layer having $\Delta N$ of 0.25 to 0.40 has a high strength of the surface of the magnetic layer, and the chipping thereof due to the sliding with the head hardly occurs. Therefore, it is considered that the magnetic layer having $\Delta N$ in the above-mentioned range is unlikely to cause the magnetic layer surface to be chipped even in a case where the information recorded on the magnetic layer is repeatedly reproduced in the high temperature and high humidity environment, and it is presumed that this contributes to suppression of a decrease in the electromagnetic conversion characteristics. From the viewpoint of further suppressing the decrease in the electromagnetic conversion characteristics, $\Delta N$ is preferably 0.25 to 0.35. A specific aspect of means for adjusting $\Delta N$ will be described later.

$\Delta N$ is an absolute value of a difference between Nxy and Nz. Nxy is a refractive index measured regarding the in-plane direction of the magnetic layer and Nz is a refractive index measured regarding the thickness direction of the magnetic layer. In one aspect, a relation of Nxy>Nz can be satisfied, and in the other aspect, Nxy<Nz can be satisfied. From a viewpoint of electromagnetic conversion characteristics of the magnetic tape, a relationship of Nxy>Nz is preferable, and therefore, the difference between the Nxy and Nz (Nxy–Nz) is preferably 0.25 to 0.40.

Hereinafter, the magnetic tape will be described more specifically.

<Magnetic Layer>

(Ferromagnetic Powder)

As the ferromagnetic powder contained in the magnetic layer, ferromagnetic powder normally used in the magnetic layer of various magnetic recording media can be used. It is preferable to use ferromagnetic powder having a small average particle size, from a viewpoint of improvement of recording density of the magnetic recording medium. From this viewpoint, ferromagnetic powder having an average particle size of 50 nm or smaller is preferably used as the ferromagnetic powder. Meanwhile, the average particle size of the ferromagnetic powder is preferably 10 nm or greater, from a viewpoint of stability of magnetization.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

In the invention and the specification, average particle sizes of various powder are values measured by the following method with a transmission electron microscope, unless otherwise noted.

The powder is imaged at a magnification ratio of 100,000 with a transmission electron microscope, the image is printed on photographic printing paper so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. A value regarding a size of powder such as the average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted.

As a method of collecting a sample powder from the magnetic recording medium in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. The average plate ratio refers to an arithmetic average of (maximum long diameter/thickness or height). In a case of the definition (3), the average particle size is an average diameter (also referred to as an average particle diameter).

In one aspect, the shape of the ferromagnetic particles configuring the ferromagnetic powder contained in the magnetic layer can be a planar shape. Hereinafter, the ferromagnetic powder including the plate-shaped ferromagnetic particles is referred to as a plate-shaped ferromagnetic powder. An average plate ratio of the plate-shaped ferromagnetic powder can be preferably 2.5 to 5.0. As the average plate ratio increases, uniformity of the alignment state of the ferromagnetic particles configuring the plate-shaped ferromagnetic powder tends to easily increase by the alignment process, and the value of ΔN tends to increase.

As an index for a particle size of the ferromagnetic powder, an activation volume can also be used. The "activation volume" is a unit of magnetization reversal. Regarding the activation volume described in the invention and the specification, magnetic field sweep rates of a coercivity He measurement part at time points of 3 minutes and 30 minutes are measured by using a vibrating sample magnetometer in an environment of an atmosphere temperature of 23° C.±1° C., and the activation volume is a value obtained from the following relational expression of Hc and an activation volume V.

$$Hc=2Ku/Ms\{1-[(kT/KuV)\ln(At/0.693)]^{1/2}\}$$

[in the expression, Ku: anisotropy constant, Ms: saturation magnetization, k: Boltzmann's constant, T: absolute temperature, V: activation volume, A: spin precession frequency, and t: magnetic field reversal time]

From a viewpoint of improving the recording density, the activation volume of the ferromagnetic powder is preferably 2,500 nm$^3$ or smaller, more preferably 2,300 nm$^3$ or smaller, and even more preferably 2,000 nm$^3$ or smaller. Meanwhile, from a viewpoint of stability of magnetization, the activation volume of the ferromagnetic powder is, for example, preferably 800 nm3 or greater, more preferably 1,000 nm3 or greater, and even more preferably 1,200 nm3 or greater.

The content (filling percentage) of the ferromagnetic powder of the magnetic layer is preferably 50% to 90% by mass and more preferably 60% to 90% by mass. Components other than the ferromagnetic powder of the magnetic layer are at least a binding agent or an oxide abrasive, may optionally include one or more additional additives. A high filling percentage of the ferromagnetic powder in the magnetic layer is preferable from a viewpoint of improvement of recording density.

(Binding Agent and Curing Agent)

The magnetic tape is a coating type magnetic tape and contains a binding agent in the magnetic layer. The binding agent is one or more kinds of resin. The resin may be a homopolymer or a copolymer. As the binding agent contained in the magnetic layer, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0029 to 0031 of JP2010-024113A can be referred to. The binding agent may be a radiation curable resin such as an electron beam curable resin. For details of the radiation curable resin, descriptions disclosed in paragraphs 0044 to 0045 of JP2011-048878A can be referred to.

An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In one aspect, as the binding agent, a binding agent containing an acidic group can be used. The acidic group of the invention and the specification is used as a meaning including a state of a group capable of emitting H$^+$ in water or a solvent including water (aqueous solvent) to dissociate anions and a salt thereof. Specific examples of the acidic group include a sulfonic acid group, a sulfuric acid group, a carboxy group, a phosphoric acid group, and salts thereof. For example, a salt of a sulfonic acid group ($-SO_3H$) is represented by $-SO_3M$, and M represents a group representing an atom (for example, alkali metal atom or the like) which may be cations in water or in an aqueous solvent. The same applies to aspects of salts of various groups described above. As an example of the binding agent containing, the acidic group, a resin including at least one kind of acidic group selected from the group consisting of a sulfonic acid group and a salt thereof (for example, a polyurethane resin or a vinyl chloride resin) can be used. However, the resin contained in the magnetic layer is not limited to these resins. In addition, in the binding agent containing the acidic group, a content of the acidic group can be, for example, 20 to 500 eq/ton. eq indicates equivalent and SI unit is a unit not convertible. The content of various functional groups such as the acidic group contained in the resin can be obtained by a well-known method in accordance with the kind of the functional group. As the binding agent having a great content of the acidic group is used, the value of ΔN tends to increase. The amount of the binding agent used in a magnetic layer forming composition can be, for example, 1.0 to 30.0 parts by mass, and preferably 1.0 to 20.0 parts by mass with respect to 100.0 parts by mass of the ferromagnetic powder. As the amount of the binding agent used with respect to the ferromagnetic powder increases, the value of ΔN tends to increase.

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent may be contained in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer contains the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of the magnetic layer.

(Oxide Abrasive)

The magnetic tape contains the oxide abrasive in the magnetic layer. The oxide abrasive is a non-magnetic oxide material powder having a Mohs hardness of greater than 8 and is preferably a non-magnetic oxide material powder having a Mohs hardness of 9 or greater. The maximum Mohs hardness is 10. The oxide abrasive may be an inorganic oxide powder or an organic oxide powder, and is preferably an inorganic oxide powder. Specifically, examples of abrasives include powders of alumina ($Al_2O_3$), titanium oxide ($TiO_2$), cerium oxide ($CeO_2$), and zirconium oxide ($ZrO_2$), and among these, an alumina powder is preferable. The Mohs hardness of alumina is about 9. For details of the alumina powder, descriptions disclosed in paragraph 0021 of JP2013-229090A can be referred to. The specific surface area can be used as an index of the particle size of the oxide abrasive. It is considered that the larger the specific surface area, the smaller the particle size of the primary particle constituting the oxide abrasive. As the oxide abrasive, it is preferable to use an oxide abrasive having a specific surface area (hereinafter, also referred to as a "BET specific surface area") of 14 $m^2/g$ or greater measured by a brunauer-emmett-teller (BET) method. From the viewpoint of dispersibility, it is preferable to use an oxide abrasive having a BET specific surface area of 40 $m^2/g$ or smaller. The content of the oxide abrasive in the magnetic layer is preferably 1.0 to 20.0 parts by mass, and more preferably 1.0 to 10.0 parts by mass with respect to 100.0 parts by mass of the ferromagnetic hexagonal powder.

(Additives)

The magnetic layer may contain the ferromagnetic powder, the binding agent, and the oxide abrasive, and may further contain one or more additives as necessary. As the additives, the curing agent described above is used as an example. In addition, examples of the additive that may be contained in the magnetic layer include non-magnetic powder other than the oxide abrasive, a lubricant, a dispersing agent, a dispersing assistant, an antibacterial agent, an antistatic agent, and an antioxidant. As the additives, a commercially available product can be suitably selected according to the desired properties or manufactured by a well-known method, and can be used with any amount. For example, for the lubricant, a description disclosed in paragraphs 0030 to 0033, 0035, and 0036 of JP2016-126817A can be referred to. The non-magnetic layer may contain the lubricant. For the lubricant which may be contained in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be included in the non-magnetic layer. For the dispersing agent which may be contained in the non-magnetic layer, a description disclosed in a paragraph 0061 of JP2012-133837A can be referred to.

Moreover, as the dispersing agent, the dispersing agent for improving the dispersibility of the oxide abrasive can be exemplified. Examples of the compound capable of functioning as such a dispersing agent include aromatic hydrocarbon compounds having a phenolic hydroxy group. "Phenolic hydroxy group" refers to a hydroxy group directly bonded to an aromatic ring. The aromatic ring contained in the aromatic hydrocarbon compound may be a single ring, a polycyclic structure, or a fused ring. From the viewpoint of improving the dispersibility of the abrasive, an aromatic hydrocarbon compound containing a benzene ring or a naphthalene ring is preferable. The aromatic hydrocarbon compound may have a substituent other than the phenolic hydroxy group. Examples of the substituent other than the phenolic hydroxy group include a halogen atom, an alkyl group, an alkoxy group, an amino group, an acyl group, a nitro group, a nitroso group, and a hydroxyalkyl group, and a halogen atom, an alkyl group, an alkoxy group, an amino group, and a hydroxyalkyl group are preferable. The number of phenolic hydroxy groups contained in one molecule of the aromatic hydrocarbon compound may be one, two, three, or more.

As the preferable aspect of the aromatic hydrocarbon compound having a phenolic hydroxy group, a compound represented by General Formula 100 below can be exemplified.

General Formula 100

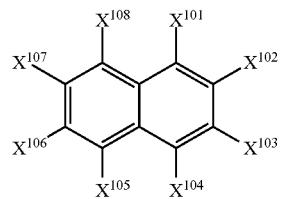

[In General Formula 100, two of $X^{101}$ to $X^{108}$ are a hydroxy group, and the other six each independently represent a hydrogen atom or a substituent.]

In the compound represented by General Formula 100, the substitution positions of two hydroxy groups (phenolic hydroxy groups) are not particularly limited.

In the compound represented by General Formula 100, two of $X^{101}$ to $X^{108}$ are hydroxy groups (phenolic hydroxy groups), and the other six each independently represent a hydrogen atom or a substituent. Further, in $X^{101}$ to $X^{108}$, all of the portions other than the two hydroxy groups may be hydrogen atoms, or a part or all of them may be a substituent. Examples of the substituent include the substituents described above. As a substituent other than the two hydroxy groups, one or more phenolic hydroxy groups may be contained. From the viewpoint of improving the dispersibility of the abrasive, it is preferable that other than the two hydroxy groups of $X^{101}$ to $X^{108}$ are not phenolic hydroxy groups. Stated another way, the compound represented by General Formula 100 is preferably dihydroxynaphthalene or a derivative thereof, and more preferably 2,3-dihydroxynaphthalene or a derivative thereof. Preferable examples of the substituent represented by $X^{101}$ to $X^{108}$ include a halogen atom (for example, a chlorine atom and a bromine atom), an amino group, an alkyl group having 1 to 6 carbon atoms (preferably 1 to 4), a methoxy group, and an ethoxy group, an acyl group, a nitro group, and a nitroso group, and a —$CH_2OH$ group.

For the dispersing agent for enhancing the dispersibility of the oxide abrasive, paragraphs 0024 to 0028 of JP2014-179149A can be referred to.

The dispersing agent for enhancing the dispersibility of the oxide abrasive can be used in a proportion of 0.5 to 20.0 parts by mass for example, and is preferably used in a proportion of 1.0 to 10.0 parts by mass with respect to 100.0 parts by mass of the abrasive at the time of preparing the magnetic layer forming composition (preferably at the time of preparing the abrasive solution as described below).

As the non-magnetic powder other than the oxide abrasive that can be contained in the magnetic layer, a non-magnetic powder that can contribute to friction characteristic control by forming projections on the surface of the magnetic layer (hereinafter also referred to as a "projection forming agent") can be exemplified. As the projection forming agent, various non-magnetic powders generally used as a projection forming agent in the magnetic layer can be used. These may be an inorganic substance powder (an inorganic powder) or an organic substance powder (an organic powder). In one aspect, from the viewpoint of uniform frictional characteristics, the particle diameter distribution of the projection forming agent is preferably monodisperse showing a single peak, not monodisperse having a plurality of peaks in the distribution. From the viewpoint of easy availability of the monodisperse particles, the projection forming agent is preferably an inorganic powder. Examples of the inorganic powder can include powder of metal oxide, metal carbonate, metal sulfate, metal nitride, metal carbide, and metal sulfide. The particles constituting the projection forming agent (a non-magnetic powder other than the oxide abrasive) are preferably colloidal particles, and more preferably inorganic oxide colloidal particles. Further, from the viewpoint of availability of monodisperse particles, the inorganic oxide constituting the inorganic oxide colloidal particles is preferably silicon dioxide (silica). The inorganic oxide colloidal particles are more preferably colloidal silica (silica colloidal particles). In the invention and the specification, "colloid particles" refers to particles that can be dispersed without settling to yield a colloidal dispersion in a case of being added 1 g per 100 mL of at least one organic solvent of methyl ethyl ketone, cyclohexanone, toluene, ethyl acetate, or a mixed solvent containing two or more of the above solvents in an any mixing ratio. In another aspect, the projection forming agent is preferably carbon black. The average particle size of the projection forming agent can be, for example, 30 to 300 nm, and preferably 40 to 200 nm. In addition, from the viewpoint of exhibiting better function of the projection forming agent, the content of the projection forming agent in the magnetic layer is preferably 1.0 to 4.0 parts by mass, and more preferably 1.5 to 3.5 parts by mass with respect to 100.0 parts by mass of the ferromagnetic powder.

The magnetic layer described above can be provided on the surface of the non-magnetic support directly or indirectly through the non-magnetic layer.

<Non-Magnetic Layer>

Next, the non-magnetic layer will be described.

The magnetic tape may contain a magnetic layer directly on the surface of the non-magnetic support or may include a non-magnetic layer including the non-magnetic powder and the binding agent between the non-magnetic support and the magnetic layer. The non-magnetic powder contained in the non-magnetic layer may be an inorganic powder or an organic powder. In addition, carbon black and the like can be used. Examples of the inorganic powder include powder of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0036 to 0039 of JP2010-024113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied.

In addition, in regards to the type and the content of the binding agent, and the type and the content of the additive, for example, the well-known technology regarding the magnetic layer can be applied.

The non-magnetic layer of the invention and the specification also includes a substantially non-magnetic layer containing a small amount of ferromagnetic powder as impurities or intentionally, together with the non-magnetic powder. Here, the substantially non-magnetic layer is a layer having a residual magnetic flux density of 10 mT or smaller, a layer having coercivity of 7.96 kA/m (100 Oe) or smaller, or a layer having a residual magnetic flux density of 10 mT or smaller and coercivity of 7.96 kA/m (100 Oe) or smaller. It is preferable that the non-magnetic layer does not have a residual magnetic flux density and coercivity.

<Non-Magnetic Support>

Next, the non-magnetic support (hereinafter, also simply referred to as a "support") will be described.

As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

<Back Coating Layer>

The magnetic tape can also include a back coating layer containing a non-magnetic powder and a binding agent on a surface of the non-magnetic support opposite to the surface provided with the magnetic layer. The back coating layer preferably contains any one or both of carbon black and inorganic powder. In regards to the binding agent contained in the back coating layer and various additives which can be randomly contained therein, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of US7,029,774B can be referred to.

<Various Thicknesses>

The thicknesses of the non-magnetic support and each layer of the magnetic recording medium will be described below.

The thickness of the non-magnetic support is, for example, 3.0 to 80.0 μm, preferably 3.0 to 50.0 μm, and more preferably 3.0 to 10.0 μm.

A thickness of the magnetic layer can be optimized according to a saturation magnetization of a magnetic head used, a head gap length, a recording signal band, and the like. The thickness of the magnetic layer is normally 10 nm to 100 nm, and is preferably 20 to 90 nm and more preferably 30 to 70 nm, from a viewpoint of realization of high-density recording. The magnetic layer may be at least one layer, or the magnetic layer can be separated to two or more layers having magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.1 to 1.5 μm and preferably 0.1 to 1.0 μm.

A thickness of the back coating layer is preferably 0.9 μm or smaller and even more preferably 0.1 to 0.7 μm.

The thicknesses of various layers and the non-magnetic support are obtained by exposing a cross section of the magnetic tape in a thickness direction by a well-known method of ion beams or microtome, and observing the exposed cross section with a scanning transmission electron microscope (STEM). For the specific examples of the measurement method of the thickness, a description disclosed regarding the measurement method of the thickness in examples which will be described later can be referred to.

<Manufacturing Step>

(Preparation of Each Layer Forming Composition)

Steps of preparing the composition for forming the magnetic layer, the non-magnetic layer, or the back coating layer generally include at least a kneading step, a dispersing step, or a mixing step provided before and after these steps, if necessary. Each step may be divided into two or more stages. The components used in the preparation of each layer forming composition may be added at an initial stage or in a middle stage of each step. As the solvent, one kind or two or more kinds of various solvents generally used for manufacturing a coating type magnetic recording medium can be used. For the solvent, a description disclosed in a paragraph 0153 of JP2011-216149A can be referred to, for example. In addition, each component may be separately added in two or more steps. For example, the binding agent may be separately added in the kneading step, the dispersing step, and a mixing step for adjusting a viscosity after the dispersion. In order to manufacture the magnetic tape, a well-known manufacturing technology of the related art can be used in various steps. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. As a disperser, a well-known disperser can be used. In any stage of preparing each layer forming composition, the filtration may be performed by a well-known method. The filtration can be performed by using a filter, for example. As the filter used in the filtration, a filter having a hole diameter of 0.01 to 3 μm (for example, filter made of glass fiber or filter made of polypropylene) can be used, for example.

The FIB abrasive diameter tends to decrease as the oxide abrasive is present in a finer state in the magnetic layer. One means for allowing the oxide abrasive to be present in a finer state in the magnetic layer is to use a dispersing agent capable of enhancing the dispersibility of the oxide abrasive as described above. In addition, in order to make the oxide abrasive in a finer state in the magnetic layer, it is preferable that an abrasive having a small particle size is used, and the abrasive is suppressed from being aggregated, suppressed from being unevenly distributed, and made to be uniformly dispersed in the magnetic layer. One means for this is to strengthen the dispersion conditions of the oxide abrasive during preparation of the magnetic layer forming composition. For example, separately dispersing the oxide abrasive from the ferromagnetic powder is one aspect of strengthening the dispersion condition. The separate dispersion is specifically a method of preparing a magnetic layer forming composition through a step of mixing an abrasive solution containing an oxide abrasive and a solvent (here, ferromagnetic powder is not substantially included) with a magnetic liquid contained the ferromagnetic powder, a solvent, and a binding agent. Thus, dispersibility of the oxide abrasive in the magnetic layer forming composition can be improved by separately dispersing and mixing the oxide abrasive and the ferromagnetic powder. The expression "ferromagnetic powder is not substantially contained" means that the ferromagnetic powder is not added as a constituent component of the abrasive solution, and a small amount of the ferromagnetic powder mixed as impurities without any intention is allowed. In addition to or with other separate dispersion, means such as long-time dispersion processing, by arbitrarily combining use of small-sized dispersion media (for example, reducing the diameter of dispersed beads in bead dispersion), or increasing the density of dispersion media in a disperser, the dispersion condition can be strengthened. Commercially available dispersers and dispersion media can be used. Further, the centrifugal treatment of the abrasive solution contributes to causing the oxide abrasive to be present in the magnetic layer in a finer state by removing oxide particles larger than the average particle size and/or aggregated particles among the particles constituting the oxide abrasive. Centrifugal treatment can be performed using a commercially available centrifuge. Further, it is preferable to filter the abrasive solution by filter filtration or the like in order to remove coarse aggregates in which particles constituting the oxide abrasive are aggregated. Removing such coarse aggregates can also contribute to the presence of the oxide abrasive in a finer state in the magnetic layer. For example, filter filtration using a filter having a smaller hole diameter can contribute to the presence of the oxide abrasive in a finer state in the magnetic layer. Also, by adjusting the various processing conditions (for example, stirring conditions, dispersion processing conditions, or filtration conditions) after mixing the abrasive solution with the components for preparing the magnetic layer forming composition such as the ferromagnetic powder, the dispersibility of the oxide abrasive in the magnetic layer forming composition can be improved. This can also contribute to the presence of the oxide abrasive in a finer state in the magnetic layer. However, in a case where the oxide abrasive is present in a very fine state in the magnetic layer, the FIB abrasive diameter becomes smaller than 0.04 μm, and thus it is preferable to adjust the various conditions for preparing the abrasive solution so that a FIB abrasive diameter of 0.04 μm to 0.08 μm can be realized.

Regarding $\Delta N$, as a period of the dispersion time of the magnetic liquid increases, the value of $\Delta N$ tends to increase. This is thought that, as a period of the dispersion time of the magnetic liquid increases, the dispersibility of the ferromagnetic powder in the coating layer of the magnetic layer forming composition increases, and the uniformity of the alignment state of the ferromagnetic particles configuring the ferromagnetic powder by the alignment process tends to easily increase.

In addition, as the period of the dispersion time in a case of mixing and dispersing various components of the non-magnetic layer forming composition increases, the value of $\Delta N$ tends to increase.

The dispersion time of the magnetic liquid and the dispersion time of the non-magnetic layer forming composition described above need only be set so that $\Delta N$ of 0.25 to 0.40 can be realized.

(Coating Step)

The non-magnetic layer and the magnetic layer can be formed by performing multilayer coating with the non-magnetic layer forming composition and the magnetic layer forming composition in order or at the same time. The back coating layer can be formed by applying the back coating layer forming composition onto the surface of the non-magnetic support opposite to the surface provided with the non-magnetic layer and the magnetic layer (or non-magnetic layer and/or the magnetic layer is to be provided). In addition, the coating step for forming each layer can be also performed by being divided into two or more stages. For example, in one aspect, the magnetic layer forming composition can be applied in two or more stages. In this case, a drying process may be performed or may not be performed during the coating steps of two stages. In addition, the alignment process may be performed or may not be performed during the coating steps of two stages. For details of the coating for forming each layer, a description disclosed in a paragraph 0066 of JP2010-231843A can be referred to. In addition, for the drying step after applying each layer forming composition, a well-known technology can be applied. Regarding the magnetic layer forming composition, as a drying temperature of a coating layer which is formed by applying the magnetic layer forming composition (hereinafter, also referred to as a "coating layer of the magnetic layer forming composition" or simply a "coating layer") decreases, the value of $\Delta N$ tends to increase. The drying temperature can be an atmosphere temperature for performing the drying step, for example, and need only be set so that $\Delta N$ of 0.25 to 0.40 can be realized.

(Other Steps)

For various other steps for manufacturing the magnetic tape, a well-known technology can be applied. For details of the various steps, descriptions disclosed in paragraphs 0067 to 0070 of JP2010-231843A can be referred to, for example.

For example, it is preferable to perform the alignment process with respect to the coating layer of the magnetic layer forming composition while the coating layer is wet. From a viewpoint of ease of exhibiting of $\Delta N$ of 0.25 to 0.40, the alignment process is preferably performed by disposing a magnet so that a magnetic field is vertically applied to the surface of the coating layer of the magnetic layer forming composition (that is, homeotropic alignment process). The strength of the magnetic field during the alignment process need only be set so that $\Delta N$ of 0.25 to 0.40 can be realized. In addition, in a case of performing the coating step of the magnetic layer forming composition by the coating steps of two or more stages, it is preferable to perform the alignment process at least after the final coating step, and it is more preferable to perform the homeotropic alignment process. For example, in a case of forming the magnetic layer by the coating steps of two stages, the drying step is performed without performing the alignment process after the coating step in the first stage, and then, the alignment process can be performed with respect to the formed coating layer in the coating step in the second stage.

In addition, it is preferable to perform the calender process in any stage after drying the coating layer of the magnetic layer forming composition. For the conditions of the calender process, a description disclosed in a paragraph 0026 of JP2010-231843A can be referred to. As the calender temperature (surface temperature of the calender roll) increases, the value of $\Delta N$ tends to increase. The calender temperature need only be set so that $\Delta N$ of 0.25 to 0.40 can be realized.

As described above, it is possible to obtain the magnetic tape according to one aspect of the invention. The magnetic tape is normally accommodated in a magnetic tape cartridge and the magnetic tape cartridge is mounted on a magnetic recording and reproducing device. A servo pattern can also be formed in the magnetic tape by a well-known method, in order to allow head tracking servo to be performed in the magnetic recording and reproducing device. In a case of reproducing information recorded on the magnetic tape in the magnetic recording and reproducing device, in a case where reproduction is performed in a high temperature and high humidity environment by relaxing management conditions of temperature and humidity or eliminating the management thereof in the environment where the magnetic recording and reproducing device is placed, with the magnetic tape according to one aspect of the invention, a decrease in the electromagnetic conversion characteristics in repeated reproduction can be suppressed.

[Magnetic Recording and Reproducing Device]

Another aspect of the invention relates to a magnetic recording and reproducing device including the magnetic tape and a magnetic head.

In the invention and the specification, the "magnetic recording and reproducing device" means a device capable of performing at least one of the recording of information on the magnetic tape or the reproducing of information recorded on the magnetic tape. Such a device is generally called a drive. The magnetic head included in the magnetic recording and reproducing device can be a recording head capable of performing the recording of information on the magnetic tape, and can also be a reproducing head capable of performing the reproducing of information recorded on the magnetic tape. In addition, in one aspect, the magnetic recording and reproducing device can include both of a recording head and a reproducing head as separate magnetic heads. In another aspect, the magnetic head included in the magnetic recording and reproducing device can also have a configuration of comprising both of a recording element and a reproducing element in one magnetic head. As the reproducing head, a magnetic head (MR head) including a magnetoresistive (MR) element capable of reading information recorded on the magnetic tape with excellent sensitivity as the reproducing element is preferable. As the MR head, various well-known MR heads can be used. In addition, the magnetic head which performs the recording of information and/or the reproducing of information may include a servo pattern reading element. Alternatively, as a head other than the magnetic head which performs the recording of information and/or the reproducing of information, a magnetic head (servo head) comprising a servo pattern reading element may be included in the magnetic recording and reproducing device.

In the magnetic recording and reproducing device, the recording of information on the magnetic tape and the reproducing of information recorded on the magnetic tape can be performed by bringing the surface of the magnetic layer of the magnetic tape into contact with the magnetic head and sliding. The magnetic recording and reproducing device may include the magnetic tape according to one aspect of the invention, and well-known technologies can be applied for the other configurations.

The magnetic recording and reproducing device includes the magnetic tape according to one aspect of the invention. Therefore, it is possible to suppress a decrease in the electromagnetic conversion characteristics while information recorded on the magnetic tape is repeatedly reproduced in a high temperature and high humidity environment. It is also considered possible to suppress chipping of the magnetic layer surface and/or the head in a case of sliding of the magnetic layer surface with the head for recording information on the magnetic tape in a high temperature and high humidity environment.

EXAMPLES

Hereinafter, the invention will be described with reference to examples. However, the invention is not limited to aspects shown in the examples. "Parts" and "%" in the following description are based on mass.

Example 1

<Preparation of Abrasive Solution>

With respect to 100.0 part of the oxide abrasive (an alumina powder) shown in Table 1, 2,3-dihydroxynaphthalene in the amount shown in Table 1 (manufactured by Tokyo Chemical Industry Co., Ltd.), 31.3 parts of a 32% solution of a polyester polyurethane resin having a SO$_3$Na group as a polar group (UR-4800 manufactured by Toyobo Co., Ltd. (polar group amount: 80 meq/kg)) (solvent is a mixed solvent of methyl ethyl ketone and toluene), and 570.0 parts of a mixed solution of methyl ethyl ketone and cyclohexanone 1:1 (the mass ratio) as a solvent were mixed and dispersed by a paint shaker for the time shown in Table 1 (bead dispersion time) in the presence of zirconia beads (the bead diameter: 0.1 mm). After the dispersion, the centrifugal treatment was performed with respect to the obtained dispersion liquid by separating the dispersion liquid and the beads by the mesh. The centrifugal treatment was performed with CS150GXL manufactured by Hitachi Koki Co., Ltd. (the used rotor was S100AT6 manufactured by the same company) as a centrifuge for the times shown in Table 1 (centrifugation time) at the rotation speed (rpm; rotation per minute) shown in Table 1. Then, filtration was performed with the filter having the hole diameter shown in Table 1, and the alumina dispersion (the abrasive solution) was obtained.

<Preparation of Magnetic Layer Forming Composition>

(Magnetic Liquid)

Plate-shaped ferromagnetic hexagonal barium ferrite powder: 100.0 parts (Activation volume and average plate ratio: see Table 1)

SO$_3$Na group-containing polyurethane resin: see Table 1

(Weight-average molecular weight: 70,000, SO$_3$Na group: see Table 1)

Cyclohexanone: 150.0 parts

Methyl ethyl ketone: 150.0 parts (Abrasive Solution)

Alumina dispersion prepared as described above: 6.0 parts (Silica Sol (projection forming agent liquid))

Colloidal silica (Average particle size: 100 nm): 2.0 parts

Methyl ethyl ketone: 1.4 parts (Other Components)

Stearic acid: 2.0 parts

Butyl stearate: 2.0 parts

Polyisocyanate (CORONATE (registered trademark) manufactured by Tosoh Corporation): 2.5 parts (Finishing Additive Solvent)

Cyclohexanone: 200.0 parts

Methyl ethyl ketone: 200.0 parts (Preparation Method)

The magnetic liquid was prepared by beads-dispersing of various components of the magnetic liquid described above by using beads as the dispersion medium in a batch type vertical sand mill. The bead dispersion was performed using zirconia beads (the bead diameter: see Table 1) as the beads for the time shown in Table 1 (the magnetic liquid bead dispersion time).

The obtained magnetic liquid, the abrasive solution, silica sol, other components and finishing additive solvent were introduced into a dissolver stirrer and stirred at a circumferential speed of 10 m/sec for the time (the stirring time) shown in Table 1. Then, after performing ultrasonic dispersion processing for a time shown in Table 1 (the ultrasonic dispersion processing time) at a flow rate of 7.5 kg/min using a flow type ultrasonic disperser, the filtration was performed for the number of times shown in Table 1 with a filter having a hole diameter shown in Table 1 to prepare the magnetic layer forming composition.

<Preparation of Non-Magnetic Layer Forming Composition>

Each component among various components of the non-magnetic layer forming composition shown below excluding stearic acid, butyl stearate, cyclohexanone, and methyl ethyl ketone was beads-dispersed (dispersion medium: zirconia beads (the bead diameter: 0.1 mm), dispersion time: see Table 1) by using a batch type vertical sand mill to obtain a dispersion liquid. After that, the remaining components were added into the obtained dispersion liquid and stirred with a dissolver stirrer. Then, the obtained dispersion liquid was filtered with a filter (hole diameter: 0.5 μm) and a non-magnetic layer forming composition was prepared.

Non-magnetic inorganic powder: α-iron oxide: 100.0 parts

Average particle size (average long axis length): 0.15 μm

Average acicular ratio: 7

BET specific surface area: 52 m$^2$/g

Carbon black: 20.0 parts

Average particle size: 20 nm

Electron beam curable vinyl chloride copolymer: 13.0 parts

Electron beam curable polyurethane resin: 6.0 parts

Stearic acid: 1.0 parts

Butyl stearate: 1.0 parts

Cyclohexanone: 300.0 parts

Methyl ethyl ketone: 300.0 parts

<Preparation of Back Coating Layer Forming Composition>

Each component among various components of the back coating layer forming composition shown below excluding stearic acid, butyl stearate, polyisocyanate, and cyclohexanone was kneaded and diluted by an open kneader, and a mixed solution was obtained. After that, the obtained mixed solution was subjected to a dispersion processing of 12 passes, with a transverse beads mill and zirconia beads having a bead diameter of 1.0 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver stirrer. Then, the obtained dispersion liquid was filtered with a filter (hole diameter: 1.0 μm) and a back coating layer forming composition was prepared.

Non-magnetic inorganic powder: α-iron oxide: 80.0 parts

Average particle size (average long axis length): 0.15 μm

Average acicular ratio: 7

BET specific surface area: 52 m$^2$/g

Carbon black: 20.0 parts

Average particle size: 20 nm

A vinyl chloride copolymer: 13.0 parts

A sulfonic acid salt group-containing polyurethane resin: 6.0 parts

Phenylphosphonic acid: 3.0 parts

Methyl ethyl ketone: 155.0 parts

Stearic acid: 3.0 parts

Butyl stearate: 3.0 parts

Polyisocyanate: 5.0 parts

Cyclohexanone: 355.0 parts

<Manufacturing of Magnetic Tape>

The non-magnetic layer forming composition was applied onto a polyethylene naphthalate support and dried, and then the non-magnetic layer was formed by irradiating an electron beam so that the energy was 40 kGy at an acceleration voltage of 125 kV.

The formed magnetic layer forming composition was applied on the surface of the non-magnetic layer to form the coating layer. The homeotropic alignment process and the drying process were performed by applying a magnetic field having a strength shown in Table 1 in the vertical direction with respect to the surface of the coating layer using opposing magnet in the atmosphere at the atmosphere temperature shown in Table 1 (the drying temperature) while the coating layer was wet, and the magnetic layer was formed.

Thereafter, a back coating layer forming composition was applied on the surface of the support opposite to the surface on which the non-magnetic layer and the magnetic layer were formed, and dried.

After that, a surface smoothing treatment (a calender process) was performed with a calender roll configured of only a metal roll, at a calendering speed of 80 m/min, linear pressure of 300 kg/cm (294 kN/m), and a calender temperature (a surface temperature of a calender roll) shown in Table 1.

Then, a heat treatment was performed in the environment of the atmosphere temperature of 70° C. for 36 hours. After the heat treatment, slits were made ½ inch (0.0127 meters) side, and the surface of the magnetic layer was cleaned by the tape cleaning device attached to a device having a device for sending and winding slit products so that the non-woven fabric and razor blade were pressed against the magnetic layer surface. Thereafter, a servo pattern was formed on the magnetic layer by a commercially available servo writer.

By doing so, a magnetic tape of Example 1 was manufactured.

Examples 2, 3, 5 and Comparative Examples 1 to 8

A magnetic tape was manufactured in the same manner as in Example 1, except that various conditions shown in Table 1 were changed as shown in Table 1. All of the oxide abrasives listed in Table 1 are alumina powders. In Table 1, in the comparative examples in which "no alignment process" is shown in the column of "formation and alignment of magnetic layer", the magnetic tape was manufactured without performing the alignment process regarding the coating layer of the magnetic layer forming composition.

Example 4

After forming the non-magnetic layer, the magnetic layer forming composition was applied on the surface of the non-magnetic layer so that the thickness after drying becomes 25 nm to form a first coating layer. The first coating layer was passed through the atmosphere at the atmosphere temperature shown in Table 1 (the drying temperature) without application of a magnetic field to form a first magnetic layer (no alignment process).

After that, the magnetic layer forming composition was applied on the surface of the first magnetic layer so that the thickness after drying becomes 25 nm to form a second coating layer. The homeotropic alignment process and the drying process were performed by applying a magnetic field having a strength shown in Table 1 in the vertical direction with respect to the surface of the second coating layer using opposing magnet in the atmosphere at the atmosphere temperature shown in Table 1 (the drying temperature) while the second coating layer was wet, and a second magnetic layer was formed. A magnetic tape was manufactured in the same manner as in Example 1, except that the multilayered magnetic layer was formed as described above.

Comparative Example 9

After forming the non-magnetic layer, the magnetic layer forming composition was applied on the surface of the non-magnetic layer so that the thickness after drying becomes 25 urn to form a first coating layer. The homeotropic alignment process and the drying process were performed by applying a magnetic field having a strength shown in Table 1 in the vertical direction with respect to the surface of the first coating layer using opposing magnet in the atmosphere at the atmosphere temperature shown in Table 1 (the drying temperature) while the first coating layer was wet, and a first magnetic layer was formed.

After that, the magnetic layer forming composition was applied on the surface of the first magnetic layer so that the thickness after drying becomes 25 nm to form a second coating layer. The second coating layer was passed through the atmosphere at the atmosphere temperature shown in Table 1 (the drying temperature) without application of a magnetic field to form a second magnetic layer (no alignment process).

A magnetic tape was manufactured in the same manner as in Example 1, except that the multilayered magnetic layer was formed as described above.

Comparative Example 10

After forming the non-magnetic layer, the magnetic layer forming composition was applied on the surface of the non-magnetic layer so that the thickness after drying becomes 25 nm to form a first coating layer. The homeotropic alignment process and the drying process were performed by applying a magnetic field having a strength shown in Table 1 in the vertical direction with respect to the surface of the first coating layer using opposing magnet in the atmosphere at the atmosphere temperature shown in Table 1 (the drying temperature) while the first coating layer was wet, and a first magnetic layer was formed.

After that, the magnetic layer forming composition was applied on the surface of the first magnetic layer so that the thickness after drying becomes 25 nm to form a second coating layer. The second coating layer was passed through the atmosphere at the atmosphere temperature shown in Table 1 (the drying temperature) without application of a magnetic field to form a second magnetic layer (no alignment process).

A magnetic tape was manufactured in the same manner as in Comparative Example 8, except that the multilayered magnetic layer was formed as described above.

Comparative Example 11

After forming the non-magnetic layer, the magnetic layer forming composition was applied on the surface of the non-magnetic layer so that the thickness after drying becomes 25 nm to form a first coating layer. The first coating layer was passed through the atmosphere at the atmosphere temperature shown in Table 1 (the drying temperature) without application of a magnetic field to form a first magnetic layer (no alignment process).

After that, the magnetic layer forming composition was applied on the surface of the first magnetic layer so that the thickness after drying becomes 25 nm to form a second coating layer. The homeotropic alignment process and the drying process were performed by applying a magnetic field having a strength shown in Table 1 in the vertical direction with respect to the surface of the second coating layer using opposing magnet in the atmosphere at the atmosphere temperature shown in Table 1 (the drying temperature) while the second coating layer was wet, and a second magnetic layer was formed.

A magnetic tape was manufactured in the same manner as in Comparative Example 6, except that the multilayered magnetic layer was formed as described above.

[Evaluation of Physical Properties of Magnetic Tape]

(1) FIB Abrasive Diameter

The FIB abrasive diameter of each magnetic tape manufactured was obtained by the following method. MI4050 manufactured by Hitachi High-Technologies Corporation was used as a focused ion beam device, and free software ImageJ was used as image analysis software.

(i) Acquisition of Secondary Ion Image

The surface of the back coating layer of the measurement sample cut out from each of the manufactured magnetic tapes was attached to the adhesive layer of a commercially available carbon double-sided tape for SEM measurement (double-sided tape with a carbon film formed on an aluminum substrate). The adhesive layer on the surface opposite to the surface of the double-sided tape with the back coating layer attached thereto was attached to the sample stage of the focused ion beam device. Thus, the measurement sample was disposed on the sample stage of the focused ion beam device in a state where the magnetic layer surface faces upward.

The pre-imaging coating process was not performed, the beam setting of the focused ion beam device was set to an acceleration voltage of 30 kV, a current value of 133 pA, a beam size of 30 nm, and brightness of 50%, and the SI signal was detected by the secondary ion detector. By performing the ACB at three unimaged regions on the surface of the magnetic layer, the tint of the image was stabilized, and the contrast reference value and the brightness reference value were determined. The contrast value obtained by lowering the contrast reference value determined by the ACB by 1% and the above brightness reference value were set as the imaging conditions. The unimaged region on the surface of the magnetic layer was selected, and imaging was performed with Pixel distance=25.0 (nm/pixel) under the imaging conditions determined above. The image capture method was PhotoScan Dot×4_Dwell Time 15 μsec (capture time: 1 minute), and the capture size was 25 μm square. Thus, a secondary ion image of a 25 μm square region on the surface of the magnetic layer was obtained. The obtained secondary ion image was saved as a JPEG file with Export Image after right-clicking on the capture screen after scanning. After confirming that the number of pixels of the image was 2000 pixels×2100 pixels, the cross mark and micron bar of the captured image were deleted, and a 2000 pixel×2000 pixel image was obtained.

(ii) Calculation of FIB Abrasive Diameter

The image data of the secondary ion image acquired in the section (i) was dragged and dropped onto the image analysis software ImageJ.

The color tone of the image data is changed to 8 bits using the image analysis software. Specifically, section "Image" on the operation menu of the image analysis software was pressed, and 8 bits in section "Type" was selected.

For binarization processing, a lower limit value of 250 gradation and an upper limit value of 255 gradation are selected, and the binarization processing is executed with these two threshold values. Specifically, on the operation menu of the image analysis software, section "Image" was pressed, "Threshold" of "Adjust" was selected, 250 as a lower limit value and 255 as an upper limit value were selected, and "apply" was selected. For the obtained image, section"Process" in the operation menu of the image analysis software is pressed, "Despeckle" was selected from section "Noise", Size4.0-Infinity in Analyze Particle was set, and the noise component was removed.

For the obtained binarized image, section "Analyze Particle" was selected from the operation menu of the image analysis software, and the number of portions that shine white and Area (unit: Pixel) on the image were obtained. The area was obtained by converting Area (unit: Pixel) into an area for each portion that shines white on the screen by image analysis software. Specifically, since 1 pixel corresponds to 0.0125 μm in the image obtained under the above imaging conditions, the area A [μm$^2$] was calculated from the area A=Area pixel×0.0125^2. Using the calculated area, the equivalent circle diameter L was obtained for each portion that shines white by the equivalent circle diameter $L=(A/\pi)^{(1/2)} \times 2 = L$.

The above process was performed four times at different locations (25 μm square) on the surface of the magnetic layer of the measurement sample, and from the obtained results, the FIB abrasive diameter was calculated by FIB abrasive diameter=Σ(Li)/Σi.

(2) Thicknesses of Non-Magnetic Support and Each Layer

The thicknesses of the magnetic layer, the non-magnetic layer, the non-magnetic support, and the back coating layer of each manufactured magnetic tape were measured by the following method. As a result of the measurement, in all of the magnetic tapes, the thickness of the magnetic layer was 50 nm, the thickness of the non-magnetic layer was 0.7 μm, the thickness of the non-magnetic support was 5.0 μm, and the thickness of the back coating layer was 0.5 μm.

The thicknesses of the magnetic layer, the non-magnetic layer, and the non-magnetic support measured here were used for calculating the following refractive index.

(i) Manufacturing of Cross Section Observation Sample

A cross section observation sample including all regions of the magnetic tape from the magnetic layer side surface to the back coating layer side surface in the thickness direction was manufactured according to the method disclosed in paragraphs 0193 and 0194 of JP2016-177851A.

(ii) Thickness Measurement

The manufactured sample was observed with the STEM and a STEM image was captured. This STEM image was a STEM-high-angle annular dark field (HAADF) image which is captured at an acceleration voltage of 300 kV and a magnification ratio of imaging of 450,000, and the imaging was performed so that entire region of the magnetic tape from the magnetic layer side surface to the back coating layer side surface in the thickness direction in one image. In the STEM image obtained as described above, a linear line connecting both ends of a line segment showing the surface of the magnetic layer was determined as a reference line showing the surface of the magnetic tape on the magnetic layer side. In a case where the STEM image was captured so that the magnetic layer side of the cross section observation sample was positioned on the upper side of the image and the back coating layer side was positioned on the lower side, for example, the linear line connecting both ends of the line segment described above is a linear line connecting an intersection between a left side of the image (shape is a rectangular or square shape) of the STEM image and the line segment, and an intersection between a right side of the STEM image and the line segment to each other. In the same manner as described above, a reference line showing the interface between the magnetic layer and the non-magnetic layer, a reference line showing the interface between the non-magnetic layer and the non-magnetic support, a reference line showing the interface between the non-magnetic support and the back coating layer, and a reference line showing the surface of the magnetic tape on the back coating layer side were determined.

The thickness of the magnetic layer was obtained as the shortest distance from one position randomly selected on the reference line showing the surface of the magnetic tape on the magnetic layer side to the reference line showing the interface between the magnetic layer and the non-magnetic layer. In the same manner as described above, the thicknesses of the non-magnetic layer, the non-magnetic support, and the back coating layer were obtained.

(3) ΔN of Magnetic Layer

Hereinafter, M-2000U manufactured by J. A. Woollam Co., Inc. was used as the ellipsometer. The creating and fitting of a double-layer model or a single-layer model were performed with WVASE32 manufactured by J. A. Woollam Co., Inc. as the analysis software.

(i) Measurement Refractive Index of Non-Magnetic Support

A sample for measurement was cut out from each magnetic tape, the back coating layer of the sample for measurement was wiped off and removed using cloth permeated with methyl ethyl ketone to expose the surface of the non-magnetic support, and then, this surface is roughened with sand paper so that reflected light of the exposed surface is not detected in the measurement which will be performed after this with the ellipsometer.

After that, by wiping off and removing the magnetic layer and the non-magnetic layer of the sample for measurement using the cloth permeated with methyl ethyl ketone and bonding a surface of a silicon wafer and the roughened surface to each other using static electricity, the sample for measurement was disposed on the silicon wafer so that the surface of the non-magnetic support exposed by removing the magnetic layer and the non-magnetic layer (hereinafter, referred to as the "surface of the non-magnetic support on the magnetic layer side") faced upward.

The incidence ray was incident to the surface of the non-magnetic support of the sample for measurement on the magnetic layer side on the silicon wafer using the ellipsometer as described above, to measure D and Ψ. By using the obtained measurement values and the thickness of the non-magnetic support obtained in the section (2), the refractive indexes of the non-magnetic support (the refractive index in a longitudinal direction, the refractive index in a width direction, the refractive index in a thickness direction measured by incidence of incidence ray in the longitudinal direction, and the refractive index in a thickness direction measured by incidence of incidence ray in the width direction) were obtained by the method described above.

(ii) Measurement of Refractive Index of Non-Magnetic Layer

A sample for measurement was cut out from each magnetic tape, the back coating layer of the sample for measurement was wiped off and removed using cloth permeated with methyl ethyl ketone to expose the surface of the non-magnetic support, and then, this surface is roughened with sand paper so that reflected light of the exposed surface is not detected in the measurement which will be performed after this with the spectroscopic ellipsometer.

After that, the surface of the magnetic layer of the sample for measurement was wiped off using the cloth permeated with methyl ethyl ketone, the magnetic layer was removed to expose the surface of the non-magnetic layer, and then, the sample for measurement was disposed on the silicon wafer in the same manner as in the section (i).

The measurement regarding the surface of the non-magnetic layer of the sample for measurement on the silicon wafer was performed using the ellipsometer, and the refractive indexes of the non-magnetic layer (the refractive index in a longitudinal direction, the refractive index in a width direction, the refractive index in a thickness direction measured by incidence of incidence ray in the longitudinal direction, and the refractive index in a thickness direction measured by incidence of incidence ray in the width direction) were obtained by the method described above by spectral ellipsometry.

(iii) Measurement of Refractive Index of Magnetic Layer

A sample for measurement was cut out from each magnetic tape, the back coating layer of the sample for measurement was wiped off and removed using cloth permeated with methyl ethyl ketone to expose the surface of the non-magnetic support, and then, this surface is roughened with sand paper so that reflected light of the exposed surface is not detected in the measurement which will be performed after this with the spectroscopic ellipsometer.

After that, the sample for measurement was disposed on the silicon wafer, in the same manner as in the section (i).

The measurement regarding the surface of the magnetic layer of the sample for measurement on the silicon wafer was performed using the ellipsometer, and the refractive indexes of the magnetic layer (the refractive index $Nx$ in a longitudinal direction, the refractive index $Ny$ in a width direction, the refractive index $Nz_1$ in a thickness direction measured by incidence of incidence ray in the longitudinal direction, and the refractive index $Nz_2$ in a thickness direction measured by incidence of incidence ray in the width direction) were obtained by the method described above by spectral ellipsometry. $Nxy$ and $Nz$ were obtained from the obtained values, and the absolute value ΔN of the difference of these values was obtained. Regarding all of magnetic tapes of the examples and the comparative examples, the obtained $Nxy$ was a value greater than $Nz$ (that is, $Nxy>Nz$).

(4) Vertical Squareness Ratio (SQ)

A vertical squareness ratio of the magnetic tape is a squareness ratio measured regarding the magnetic tape in a vertical direction. The "vertical direction" described regarding the squareness ratio is a direction orthogonal to the surface of the magnetic layer. Regarding each magnetic tape which was manufactured, the vertical squareness ratio was obtained by sweeping an external magnetic field in the magnetic tape at a measurement temperature of 23° C.±1° C. using a vibrating sample magnetometer (manufactured by Toei Industry Co., Ltd.) under conditions of a maximum external magnetic field of 1194 kA/m (15 kOe) and a scan speed of 4.8 kA/m/sec (60 Oe/sec). The measurement value is a value after diamagnetic field correction, and is obtained as a value obtained by subtracting magnetization of a sample probe of the vibrating sample magnetometer as background noise. In one aspect, the vertical squareness ratio of the magnetic tape is preferably 0.60 to 1.00 and more preferably 0.65 to 1.00. In addition, in one aspect, the vertical squareness ratio of the magnetic tape can be, for example, 0.90 or smaller, 0.85 or smaller, or 0.80 or smaller, and can also be greater than these values.

[Change in Electromagnetic Conversion Characteristic (SNR; Signal-to-Noise-Ratio) after Repeated Reproduction Under High Temperature and High Humidity Environment (SNR Reduction Amount)]

The electromagnetic conversion characteristics (SNR) were measured by the following method using a ½ inch (0.0127 meter) reel tester to which the head was fixed.

The recording was performed using a metal in gap (MIG) head (a gap length: 0.15 μm and a track width: 1.0 μm) with a relative head and tape speed of 5.5 m/sec, and the recording current was optimized for each magnetic tape.

A giant magnetoresistive (GMR) head having an element thickness of 15 nm, a shield interval of 0.1 μm, and a lead width of 0.5 μm was used as a reproducing head. The signal was recorded at a linear recording density of 270 kfci, and the reproduction signal was measured with a spectrum analyzer manufactured by Shibasoku. The unit kfci is a unit of linear recording density (cannot be converted into SI unit system). The signal used was a portion where the signal was sufficiently stable after the start of running of the magnetic tape. The ratio between the output value of the carrier signal and the integrated noise over the entire spectrum was defined as SNR.

Under the above conditions, the reproduction was performed by reciprocating 5,000 passes in an environment at an ambient temperature of 32° C. and a relative humidity of 80% (the head and tape relative speed: 6.0 m/sec) with the tape length per pass of 1,000 m, and the SNR was measured. The difference between the SNR of the first pass and the SNR of the 5,000th pass (SNR of the 5,000th pass—SNR of the first pass) was determined. In a case where the difference was smaller than −2.0 dB, it can be determined that the magnetic tape exhibits excellent electromagnetic conversion characteristics desired for a data backup tape.

The results of the above evaluation are shown in Table 1 (Table 1-1 and Table 1-2).

TABLE 1-1

| | | Comparative Example 1 | Comparative Example 2 | Comparative Example 3 | Comparative Example 4 | Comparative Example 5 |
|---|---|---|---|---|---|---|
| Preparation of abrasive solution | Oxide abrasive product name (manufactured by Sumitomo Chemical Co., Ltd.) | Hit70 | Hit80 | Hit80 | Hit100 | Hit70 |
| | Abrasive solution BET specific surface area (m²/g) | 20 | 30 | 30 | 40 | 30 |
| | Abrasive solution dispersion liquid (2,3-dihydroxynaphthalene) content | 0 part | 3.0 parts | 0 part | 3.0 parts | 3.0 parts |
| | Bead dispersion time | 5 minutes | 5 minutes | 60 minutes | 180 minutes | 60 minutes |
| | Centrifugation Rotation speed | None | None | 3500 rpm | 3500 rpm | 3500 rpm |
| | Centrifugation time | None | None | 3.8 minutes | 3.8 minutes | 3.8 minutes |
| | Filter hole diameter | 0.5 μm | 0.5 μm | 0.3 μm | 0.3 μm | 0.3 μm |
| Preparation of magnetic layer forming composition | Stirring time | 5 minutes | 30 minutes | 60 minutes | 360 minutes | 360 minutes |
| | Ultrasonic dispersion processing time | 0.5 minutes | 0.5 minutes | 60 minutes | 60 minutes | 60 minutes |
| | Filter hole diameter | 0.5 μm | 0.5 μm | 0.3 μm | 0.3 μm | 0.3 μm |
| | Filtration processing number | Once | Once | Twice | Three times | Three times |
| Ferromagnetic powder | Average plate ratio | 2.0 | 3.0 | 3.0 | 3.0 | 2.0 |
| | Activation volume | 1600 nm³ | 1600 nm³ | 1600 nm³ | 1600 nm³ | 1600 nm³ |
| Magnetic liquid bead dispersion time | | 6 hours | 50 hours | 50 hours | 50 hours | 6 hours |
| Magnetic liquid dispersion bead diameter | | 1 mm | 0.1 mm | 0.1 mm | 0.1 mm | 1 mm |
| Magnetic liquid Amount of SO₃Na group in polyurethane resin | | 60 eq/ton | 3300 eq/ton | 330 eq/ton | 330 eq/ton | 60 eq/ton |
| Magnetic liquid Content of SO₃Na group containing polyurethane resin | | 25.0 parts | 15.0 parts | 15.0 parts | 15.0 parts | 25.0 parts |
| Non-magnetic layer forming composition dispersion time | | 3 hours | 24 hours | 24 hours | 24 hours | 3 hours |
| Magnetic layer drying temperature | | 70° C. | 50° C. | 50° C. | 50° C. | 70° C. |
| Calender temperature | | 80° C. | 100° C. | 100° C. | 100° C. | 80° C. |
| Formation and alignment of magnetic layer | | No alignment process | Homeotropic alignment 0.5 T | Homeotropic alignment 0.5 T | Homeotropic alignment 0.5 T | No alignment process |
| Result | Vertical squareness ratio (SQ) | 0.50 | 0.66 | 0.66 | 0.66 | 0.50 |
| | ΔN | 0.10 | 0.30 | 0.30 | 0.30 | 0.10 |
| | FIB abrasive diameter | 0.20 μm | 0.16 μm | 0.08 μm | 0.03 μm | 0.14 μm |
| | Missing pulse generation frequency (time/m) | −5.0 | −4.0 | −3.5 | −4.5 | −.5 |

| | | Comparative Example 6 | Comparative Example 7 | Comparative Example 8 | Comparative Example 9 |
|---|---|---|---|---|---|
| Preparation of abrasive solution | Oxide abrasive product name (manufactured by Sumitomo Chemical Co., Ltd.) | Hit70 | Hit70 | Hit70 | Hit70 |
| | Abrasive solution BET specific surface area (m²/g) | 30 | 30 | 30 | 30 |
| | Abrasive solution dispersion liquid (2,3-dihydroxynaphthalene) content | 3.0 parts | 3.0 parts | 3.0 parts | 3.0 parts |
| | Bead dispersion time | 60 minutes | 60 minutes | 60 minutes | 60 minutes |
| | Centrifugation Rotation speed | 3500 rpm | 3500 rpm | 3500 rpm | 3500 rpm |
| | Centrifugation time | 3.8 minutes | 3.8 minutes | 3.8 minutes | 3.8 minutes |
| | Filter hole diameter | 0.3 μm | 0.3 μm | 0.3 μm | 0.3 μm |

TABLE 1-1-continued

|  |  |  |  |  |  |
|---|---|---|---|---|---|
| Preparation of magnetic layer forming composition | Stirring time | 360 minutes | 360 minutes | 360 minutes | 360 minutes |
|  | Ultrasonic dispersion processing time | 60 minutes | 60 minutes | 60 minutes | 60 minutes |
|  | Filter hole diameter | 0.3 µm | 0.3 µm | 0.3 µm | 0.3 µm |
|  | Filtration processing number | Three times | Three times | Three times | Three times |
| Ferromagnetic powder | Average plate ratio | 2.0 | 3.0 | 6.0 | 3.0 |
|  | Activation volume | 1600 nm$^3$ | 1600 nm$^3$ | 1600 nm$^3$ | 1600 nm$^3$ |
| Magnetic liquid bead dispersion time |  | 6 hours | 50 hours | 96 hours | 50 hours |
| Magnetic liquid dispersion bead diameter |  | 1 mm | 0.1 mm | 0.1 mm | 0.1 mm |
| Magnetic liquid Amount of SO$_3$Na group in polyurethane resin |  | 60 eq/ton | 330 eq/ton | 330 eq/ton | 330 eq/ton |
| Magnetic liquid Content of SO$_3$Na group containing polyurethane resin |  | 25.0 parts | 15.0 parts | 10.0 parts | 15.0 parts |
| Non-magnetic layer forming composition dispersion time |  | 3 hours | 24 hours | 48 hours | 24 hours |
| Magnetic layer drying temperature |  | 70° C. | 50° C. | 30° C. | 50° C. |
| Calender temperature |  | 80° C. | 100° C. | 110° C. | 100° C. |
| Formation and alignment of magnetic layer |  | Homeotropic alignment 0.5 T | No alignment process | Homeotropic alignment 0.5 T | Second layer: no alignment process/first layer: homeotropic alignment 0.5 T |
| Result | Vertical squareness ratio (SQ) | 0.55 | 0.53 | 0.80 | 0.60 |
|  | ΔN | 0.20 | 0.20 | 0.45 | 0.20 |
|  | FIB abrasive diameter | 0.14 µm | 0.14 µm | 0.14 µm | 0.14 µm |
|  | Missing pulse generation frequency (time/m) | −3.0 | −3.0 | −4.0 | −3.0 |

TABLE 1-2

|  |  | Comparative Example 10 | Comparative Example 11 | Example 1 |
|---|---|---|---|---|
| Preparation of abrasive solution | Oxide abrasive product name (manufactured by Sumitomo Chemical Co., Ltd.) | Hit80 | Hit80 | Hit80 |
|  | Abrasive solution BET specific surface area (m$^2$/g) | 30 | 30 | 30 |
|  | Abrasive solution dispersion liquid (2,3-dihydroxynaphthalenc) content | 3.0 parts | 3.0 parts | 3.0 parts |
|  | Bead dispersion time | 60 minutes | 60 minutes | 60 minutes |
|  | Centrifugation Rotation speed | 3500 rpm | 3500 rpm | 3500 rpm |
|  | Centrifugation time | 3.8 minutes | 3.8 minutes | 3.8 minutes |
|  | Filter hole diameter | 0.3 µm | 0.3 µm | 0.3 µm |
| Preparation of magnetic layer forming composition | Stirring time | 360 minutes | 360 minutes | 360 minutes |
|  | Ultrasonic dispersion processing time | 60 minutes | 60 minutes | 60 minutes |
|  | Filter hole diameter | 0.3 µm | 0.3 µm | 0.3 µm |
|  | Filtration processing number | Three times | Three times | Three times |
| Ferromagnetic powder | Average plate ratio | 6.0 | 2.0 | 3.0 |
|  | Activation volume | 1600 nm$^3$ | 1600 nm$^3$ | 1600 nm$^3$ |
| Magnetic liquid bead dispersion time |  | 96 hours | 6 hours | 50 hours |
| Magnetic liquid dispersion bead diameter |  | 0.1 mm | 1 mm | 0.1 mm |
| Magnetic liquid Amount of SO$_3$Na group in polyurethane resin |  | 330 eq/ton | 60 eq/ton | 330 eq/ton |
| Magnetic liquid Content of SO$_3$Na group containing polyurethane resin |  | 10.0 parts | 25.0 parts | 15.0 parts |
| Non-magnetic layer forming composition dispersion time |  | 48 hours | 3 hours | 24 hours |
| Magnetic layer drying temperature |  | 30° C. | 70° C. | 50° C. |
| Calender temperature |  | 110° C. | 80° C. | 100° C. |
| Formation and alignment of magnetic layer |  | Second layer: no alignment process/first layer: homeotropic alignment 0.5 T | Second layer: homeotropic alignment 0.5 T/first layer: no alignment process | Homeotropic alignment 0.5 T |
| Result | Vertical squareness ratio (SQ) | 0.66 | 0.53 | 0.66 |
|  | ΔN | 0.20 | 0.20 | 0.30 |
|  | FIB abrasive diameter | 0.06 µm | 0.06 µm | 0.06 µm |
|  | Missing pulse generation frequency (time/m) | −3.5 | −3.0 | −0.5 |

|  |  | Example 2 | Example 3 | Example 4 | Example 5 |
|---|---|---|---|---|---|
| Preparation of abrasive solution | Oxide abrasive product name (manufactured by Sumitomo Chemical Co., Ltd.) | Hit70 | Hit80 | Hit80 | Hit80 |
|  | Abrasive solution BET specific surface area (m$^2$/g) | 20 | 30 | 30 | 30 |

TABLE 1-2-continued

| | | | | | |
|---|---|---|---|---|---|
| | Abrasive solution dispersion liquid (2,3-dihydroxynaphthalene) content | 3.0 parts | 3.0 parts | 3.0 parts | 3.0 parts |
| | Bead dispersion time | 60 minutes | 180 minutes | 60 minutes | 60 minutes |
| | Centrifugation Rotation speed | 5500 rpm | 3500 rpm | 3500 rpm | 3500 rpm |
| | Centrifugation time | 3.8 minutes | 3.8 minutes | 3.8 minutes | 3.8 minutes |
| | Filter hole diameter | 0.3 μm | 0.3 μm | 0.3 μm | 0.3 μm |
| Preparation of magnetic layer forming composition | Stirring time | 180 minutes | 360 minutes | 360 minutes | 360 minutes |
| | Ultrasonic dispersion processing time | 60 minutes | 60 minutes | 60 minutes | 60 minutes |
| | Filter hole diameter | 0.3 μm | 0.3 μm | 0.3 μm | 0.3 μm |
| | Filtration processing number | Twice | Three times | Three times | Three times |
| Ferromagnetic powder | Average plate ratio | 3.0 | 3.0 | 3.0 | 3.0 |
| | Activation volume | 1600 nm$^3$ | 1600 nm$^3$ | 1600 nm$^3$ | 1600 nm$^3$ |
| Magnetic liquid bead dispersion time | | 50 hours | 50 hours | 50 hours | 50 hours |
| Magnetic liquid dispersion bead diameter | | 0.1 mm | 0.1 mm | 0.1 mm | 0.1 mm |
| Magnetic liquid Amount of SO$_3$Na group in polyurethane resin | | 330 eq/ton | 330 eq/ton | 330 eq/ton | 330 eq/ton |
| Magnetic liquid Content of SO$_3$Na group containing polyurethane resin | | 15.0 parts | 15.0 parts | 15.0 parts | 15.0 parts |
| Non-magnetic layer forming composition dispersion time | | 24 hours | 24 hours | 24 hours | 24 hours |
| Magnetic layer drying temperature | | 50° C. | 50° C. | 50° C. | 50° C. |
| Calender temperature | | 100° C. | 100° C. | 100° C. | 100° C. |
| Formation and alignment of magnetic layer | | Homeotropic alignment 0.5 T | Homeotropic alignment 0.5 T | Second layer: homeotropic alignment 0.5 T/first layer: no alignment process | Homeotropic alignment 0.2 T |
| Result | Vertical squareness ratio (SQ) | 0.66 | 0.66 | 0.60 | 0.60 |
| | ΔN | 0.30 | 0.30 | 0.35 | 0.25 |
| | FIB abrasive diameter | 0.08 μm | 0.04 μm | 0.06 μm | 0.06 μm |
| | Missing pulse generation frequency (time/m) | −1.0 | −1.5 | −1.0 | −1.5 |

From the results shown in Table 1, it was confirmed that in the magnetic tapes of Examples 1 to 5 in which ΔN and the FIB abrasive diameter of the magnetic layer were within the ranges described above, a decrease in the electromagnetic conversion characteristics in repeated reproduction under a high temperature and high humidity environment was suppressed.

In general, the squareness ratio is known as an index for a state of the ferromagnetic powder present in the magnetic layer. However, as shown in Table 1, even in a case of the magnetic tapes having the same vertical squareness ratios, ΔN are different from each other (for example, Examples 1 to 3 and Comparative Example 10). The inventors have thought that this shows that ΔN is a value which is affected by other factors, in addition to the state of the ferromagnetic powder present in the magnetic layer.

One aspect of the invention is effective in a technical field of various magnetic recording media such as a magnetic tape for data storage.

What is claimed is:

1. A magnetic tape comprising a magnetic layer containing a ferromagnetic powder and a binding agent on a non-magnetic support,
wherein the magnetic layer contains an oxide abrasive,
an average particle diameter of the oxide abrasive obtained from a secondary ion image acquired by irradiating a surface of the magnetic layer with a focused ion beam is 0.04 μm to 0.08 μm, and
an absolute value ΔN of a difference between a refractive index Nxy measured with respect to an in-plane direction of the magnetic layer and a refractive index Nz measured with respect to a thickness direction of the magnetic layer is 0.25 to 0.40.

2. The magnetic tape according to claim 1,
wherein the oxide abrasive is an alumina powder.

3. The magnetic tape according to claim 1,
wherein the ferromagnetic powder is a ferromagnetic hexagonal ferrite powder.

4. The magnetic tape according to claim 1,
wherein the difference Nxy−Nz between the refractive index Nxy and the refractive index Nz is 0.25 to 0.40.

5. The magnetic tape according to claim 1, further comprising a non-magnetic layer containing a non-magnetic powder and a binding agent between the non-magnetic support and the magnetic layer.

6. The magnetic tape according to claim 1, further comprising a back coating layer containing a non-magnetic powder and a binding agent on a surface of the non-magnetic support opposite to a surface provided with the magnetic layer.

7. A magnetic recording and reproducing device comprising:
the magnetic tape according to claim 1; and
a magnetic head.

8. The magnetic recording and reproducing device according to claim 7,
wherein the oxide abrasive is an alumina powder.

9. The magnetic recording and reproducing device according to claim 7,
wherein the ferromagnetic powder is a ferromagnetic hexagonal ferrite powder.

10. The magnetic recording and reproducing device according to claim 7,
wherein the difference Nxy−Nz between the refractive index Nxy and the refractive index Nz is 0.25 to 0.40.

11. The magnetic recording and reproducing device according to claim 7,
wherein the magnetic tape further comprises a non-magnetic layer containing a non-magnetic powder and a binding agent between the non-magnetic support and the magnetic layer.

12. The magnetic recording and reproducing device according to claim 7,
   wherein the magnetic tape further comprises a back coating layer containing a non-magnetic powder and a binding agent on a surface of the non-magnetic support opposite to a surface provided with the magnetic layer.

\* \* \* \* \*